US008290346B2

(12) United States Patent
Ernst et al.

(10) Patent No.: US 8,290,346 B2
(45) Date of Patent: Oct. 16, 2012

(54) LARGE FORMAT VIDEO ARCHIVAL, STORAGE, AND RETRIEVAL SYSTEM AND METHOD

(75) Inventors: Rudolf O. Ernst, Leesburg, VA (US); Rahul Thakkar, Sterling, VA (US)

(73) Assignee: Pixia Corp., Sterling, VA (US)

( * ) Notice: Subject to any disclaimer, the term of this patent is extended or adjusted under 35 U.S.C. 154(b) by 1056 days.

(21) Appl. No.: 12/237,870

(22) Filed: Sep. 25, 2008

(65) Prior Publication Data

US 2010/0073371 A1 Mar. 25, 2010

(51) Int. Cl.
*H04N 5/92* (2006.01)

(52) U.S. Cl. ........................................................ 386/326

(58) Field of Classification Search ......................... None
See application file for complete search history.

(56) References Cited

U.S. PATENT DOCUMENTS

| | | | |
|---|---|---|---|
| 4,823,108 | A | 4/1989 | Pope |
| 4,873,513 | A | 10/1989 | Soults et al. |
| 4,878,117 | A | 10/1989 | Ikehira et al. |
| 5,263,136 | A | 11/1993 | Deaguiar et al. |
| 5,341,466 | A | 8/1994 | Perlin et al. |
| 5,414,809 | A | 5/1995 | Hogan et al. |
| 5,513,282 | A | 4/1996 | Williams |
| 5,611,041 | A | 3/1997 | Bril et al. |
| 5,706,451 | A | 1/1998 | Lightbody et al. |
| 5,710,835 | A | 1/1998 | Bradley |
| 5,819,278 | A | 10/1998 | Hamburg |
| 5,831,612 | A | 11/1998 | Stoval, III et al. |
| 5,847,705 | A | 12/1998 | Pope |
| RE36,145 | E | 3/1999 | Deaguiar et al. |
| 5,889,669 | A | 3/1999 | Kagami et al. |
| 5,905,506 | A | 5/1999 | Hamburg |
| 5,933,537 | A | 8/1999 | Hajjahmad et al. |
| 6,012,109 | A | 1/2000 | Schultz |
| 6,075,905 | A | 6/2000 | Herman et al. |
| 6,091,430 | A | 7/2000 | Bodin et al. |
| 6,130,661 | A | 10/2000 | Ilbery |

(Continued)

FOREIGN PATENT DOCUMENTS

| | | |
|---|---|---|
| JP | 2000-148066 A | 5/2000 |

(Continued)

OTHER PUBLICATIONS

Australian Office Action for Australian Patent Application No. 2007242940, mailed on Oct. 5, 2009.

(Continued)

*Primary Examiner* — Huy T Nguyen
(74) *Attorney, Agent, or Firm* — Pillsbury Winthrop Shaw Pittman, LLP

(57) ABSTRACT

A method for storing a video on a storage device includes formatting each image in a plurality of images into a plurality of tiles, the plurality of images being captured as a temporal sequence of images at successive points in time; and generating a plurality of video segments from the temporal sequence of images by: selecting a tile from each image in the sequence of images to obtain a sequence of tiles to generate a video segment; selecting another tile from each image in the sequence of images to obtain another sequence of tiles to generate another video segment; and repeating the selecting a tile from each image in the sequence of images to obtain a plurality of sequences of tiles to generate the plurality of video segments. The method further includes storing the obtained plurality of video segments in a file on the storage device.

18 Claims, 19 Drawing Sheets

U.S. PATENT DOCUMENTS

| | | | | |
|---|---|---|---|---|
| 6,141,023 | A | 10/2000 | Meinerth et al. | |
| 6,182,127 | B1 | 1/2001 | Cronin, III et al. | |
| 6,192,393 | B1 | 2/2001 | Tarantino et al. | |
| 6,222,562 | B1 | 4/2001 | Leidich | |
| 6,262,741 | B1 | 7/2001 | Davies | |
| 6,278,432 | B1 | 8/2001 | Ratnakar | |
| 6,323,854 | B1 | 11/2001 | Knox et al. | |
| 6,377,306 | B1 | 4/2002 | Johnson et al. | |
| 6,400,763 | B1 | 6/2002 | Wee | |
| 6,493,858 | B2 | 12/2002 | Solomon | |
| 6,549,681 | B1 | 4/2003 | Takiguchi et al. | |
| 6,674,881 | B2 | 1/2004 | Bacus et al. | |
| 6,711,283 | B1 | 3/2004 | Soenksen | |
| 6,714,205 | B1 | 3/2004 | Miyashita et al. | |
| 6,721,952 | B1 | 4/2004 | Guedalia et al. | |
| 6,904,176 | B1 | 6/2005 | Chui et al. | |
| 6,912,253 | B1 | 6/2005 | Li et al. | |
| 6,912,695 | B2 | 6/2005 | Ernst et al. | |
| 7,080,131 | B2 | 7/2006 | Palevich et al. | |
| 7,085,435 | B2 | 8/2006 | Takiguchi et al. | |
| 7,119,811 | B2 * | 10/2006 | Ernst et al. | 345/545 |
| 7,366,360 | B2 | 4/2008 | Takiguchi et al. | |
| 7,607,106 | B2 | 10/2009 | Ernst et al. | |
| 2002/0004860 | A1 | 1/2002 | Roman | |
| 2002/0093516 | A1 | 7/2002 | Brunner et al. | |
| 2002/0159632 | A1 | 10/2002 | Chui et al. | |
| 2002/0194302 | A1 | 12/2002 | Blumberg | |
| 2002/0196467 | A1 | 12/2002 | Delhoune et al. | |
| 2003/0031258 | A1 | 2/2003 | Wang et al. | |
| 2003/0034936 | A1 | 2/2003 | Ernst et al. | |
| 2003/0063127 | A1 * | 4/2003 | Ernst et al. | 345/792 |
| 2003/0067420 | A1 | 4/2003 | Ernst et al. | |
| 2006/0210196 | A1 | 9/2006 | Wensley et al. | |
| 2007/0124793 | A1 | 5/2007 | Wang et al. | |
| 2010/0166056 | A1 * | 7/2010 | Perlman et al. | 375/240.01 |
| 2011/0292287 | A1 * | 12/2011 | Washington | 348/571 |
| 2011/0317931 | A1 * | 12/2011 | Dvir et al. | 382/233 |

FOREIGN PATENT DOCUMENTS

WO 00/68887 A1 11/2000

OTHER PUBLICATIONS

Canadian Office Action issued regarding Canadian Patent Application No. 2,406,675, mailed Jul. 30, 2010.

Canadian Office Action issued regarding Canadian Patent Application No. 2,463,671, mailed Jul. 8, 2010.

Chinese Office Action for Chinese Patent Application No. 038244276, mailed on Oct. 26, 2007.

Chinese Office Action for Chinese Patent Application No. 038244276, mailed on Aug. 8, 2008.

Chinese Office Action for Chinese Patent Application No. 038244276, mailed on Feb. 6, 2009.

European Office Action for European Patent Application No. 02759681.6, mailed on Sep. 22, 2008.

Supplemental European Search Report for European Patent Application No. 02759681.6, mailed on Jun. 27, 2008.

European Office Action for European Patent Application No. 03799307.8, mailed on Jan. 23, 2009.

Supplemental European Search Report for European Patent Application No. 03799307.8, mailed on Jun. 27, 2008.

Israeli Office Action for Israeli Patent Application No. 167711, mailed on Jan. 25, 2009.

Israeli Office Action for Israeli Patent Application No. 167711, mailed on Oct. 11, 2009.

Israeli Office Action for Israeli Patent Application No. 167711, mailed on Jun. 24, 2010.

Japanese Office Action for Japanese Patent Application No. 2004-541816, mailed on Feb. 2, 2010.

International Preliminary Examination Report for PCT International Patent Application No. PCT/US02/29210, mailed on May 24, 2004.

International Search Report for PCT International Patent Application No. PCT/US02/29210, mailed on Dec. 17, 2002.

International Preliminary Examination Report for PCT International Patent Application No. PCT/US03/30639, mailed on Dec. 3, 2004.

International Search Report for PCT International Patent Application No. PCT/US03/30639, mailed on Apr. 21, 2004.

Philippines Office Action for Philippines Patent Application No. 1-2005-500632, mailed on Feb. 19, 2009.

Barclay et al., Microsoft TerraServer: A Spatial Data Warehouse, The Institution of Electrical Engineers Stevenage, Jun. 2000, Great Britain; and 2000 ACM Sigmod. International Conference on Management of Data, May 16-18, 2000, Dallas, Texas, vol. 29, No. 2, Jun. 1, 2000, pp. 307-318, retrieved from url: <ftp://ftp.research.microsoft.com/pub/tr/tr-99-29.pdf>.

Bhatia et al., Design and Performance Analysis of A Distributed Image Space Navigator, Internet citation Aug. 1, 1997, Washington University Sever Institute of Technology, Department of Computer Science.

Yu et al., Processing Satellite Images on Tertiary Storage: A Study of the Impact of the Tile Size on Performance, NASA Conference on Mass Storage Systems, Sep. 1, 1996, College Park, Maryland, retrieved from url: <http://ntrs.nasa.gov/archive/nasa/casi.ntrs.nasa.gov/19960052752_1996083214.pdf>.

Information Technology—Generic Coding of Moving Pictures and Associated Audio Information: Systems, International Standard, ISO/IEC 13818-1, Second Edition, Dec. 1, 2000.

Japanese Decision of Rejection for Japanese Patent Application No. 2004-541816, mailed on Nov. 24, 2010.

Japanese Official Letter of Inquiry and Pre-Appeal Examination Report for Japanese Patent Application No. 2004-541816, mailed on Sep. 13, 2011.

Canadian Office Action for Canadian Patent Application No. 2,463,671, mailed Aug. 15, 2011.

* cited by examiner

IN THE EXAMPLE ABOVE
$D_W = P_c = \frac{1}{2}T_W$ AND $D_h = P_r = \frac{1}{2}T_h$

LARGE FORMAT VIDEO ARCHIVAL, STORAGE, AND RETRIEVAL SYSTEM AND METHOD

U.S. Pat. No. 7,119,811 issued on Oct. 10, 2006 to Ernst et al. entitled Image Display System and U.S. Pat. No. 6,912,695 issued on Jun. 28, 2005 to Ernst et al. entitled Data Storage and Retrieval System and Method are both hereby incorporated by reference.

FIELD OF THE INVENTION

The present invention relates to digital video systems, and more in particular to a digital video system configured to archive, store and retrieve large format video.

BACKGROUND OF THE INVENTION

Video is the technology of electronically capturing, recording, processing, storing, transmitting, and reconstructing a sequence of still images representing scenes in motion. The archival, storage and retrieval of video is highly desirable for innumerable military, government, commercial and private applications. The use of digital video is particularly desirable due to the superior ability of computer systems to archive, store and retrieve digital video images. The capacity of computer systems to manage digital video corresponds to the size of the digital video images, which is measured in pixels.

A large format video is a video whose width and height exceed standard definition and high definition video standards. A large format video may also exceed additional large format standards describing IMAX formats.

Several methods are available to capture a video of a sequence of frames of very large size. Some capture systems employ a matrix of frames of camera sensors that each individually capture a fraction of the image. Each frame for a specific time interval is then set as a mosaic into a single large video frame. Other capture systems employ a single large sensor to generate a very large frame.

An example of a very large frame would be a 5000 pixel by 5000 pixel of a 25-mega pixel frame. Another example of a very large frame would be a 33,333 pixel by 33,333 pixel frame of a 1-giga pixel sensor system. It is contemplated that even larger pixel sensor systems may be used. In contrast, standard definition video images have a size of approximately 720 pixels by 480 pixels. High definition video images have a size of approximately 1280 pixels by 720 pixels or 1920 pixels by 1080 pixels. Additional large format standards describing IMAX formats have video sizes of 12 to 24 mega pixels.

SUMMARY OF THE INVENTION

The present invention is for a system for storing video on a storage device. The system includes an image frame formatting module configured to format an image frame. The image frame formatting module is configured to read pixel data of a source image and generate, from the read pixel data, a first tile and a second tile, wherein the first tile and the second tile each have overlapping portions that overlap by an adjustable amount, and the overlapping portions include substantially identical pixel data. The image frame formatting module is configured to store the first tile and the second tile on the storage device. The image frame formatting module is configured to repeat the reading, generating, and storing of a plurality of tiles to store the image frame. The image frame formatting module is configured to store the image frame on the storage device as a contiguous stream of data. The image frame formatting module is also configured to store a sequence of image frames on the storage device, wherein a first video segment is comprised of a first temporal sequence of first tiles.

In another embodiment of the invention, a software system for viewing a video stream from large data files with high ratio in and out zoom and/or pan without image degradation and with high speed of image presentation and manipulation is disclosed. The software system is configured to interface with a storage drive. The software system includes an image frame formatting module configured to store temporally sequential image sections of the digital files in tiled and overlapping format in a storage drive. The software system also includes an image frame display module configured to stream temporally sequential image data to a display without substantial computer operating system intervention, wherein when panning or zooming results in switching to a different video segment, switching between video segments occurs within a display refresh interval.

In another embodiment of the invention, a method and apparatus to archive, store and retrieve large format video is disclosed. According to one embodiment of the invention, a method of storing a video on a storage device is disclosed that includes formatting an image frame and storing a sequence of image frames on a storage device. The method of formatting an image frame further includes reading pixel data of a source image and generating, from the read pixel data, a first tile and a second tile, wherein the first tile and the second tile each have overlapping portions that overlap by an adjustable amount, and the overlapping portions include substantially identical pixel data. The amount of adjustable overlap varies from 0 to 100 percent. The method of formatting an image frame also includes storing the first tile and the second tile on the storage device, and repeating the reading, generating, and storing a plurality of times to store the image frame, wherein the image frame is stored on the storage device as a contiguous stream of data. The method then stores a sequence of image frames on the storage device, wherein a first video is comprised of a first temporal sequence of first tiles.

The method may include formatting an image frame includes formatting the storage device to include a block size, wherein a video segment size is stored as an integer multiple of block size and the video segment size corresponds to a display output. The method may further include formatting a reduced resolution dataset for each image frame. In addition, the method may also include a second video segment comprised of a second temporal sequence of first tiles, wherein the first and second video segments are stored sequentially. Alternatively, the method may include a second video segment comprised of a second temporal sequence of first tiles, wherein the first and second video segments are stored in an interleaved format.

The method may also include a single seek and a single read operation performed by the storage device that can access a selected video segment. In addition, the method can include formatting the storage device to store a plurality of video segments as a plurality of fixed length records of equal length for optimized retrieval, wherein at least two of the videos have different sizes. Still further, the method can include encoding the first video segment with motion compensation to compress a size of the first video segment.

Additionally, the method can include formatting each resolution dataset to be formed of overlapping tiles and/or storing each tile at a disk block boundary. Also, the method may include formatting the storage device to store a plurality of variable length video segments as a plurality of variable length records for optimized retrieval.

In another embodiment of the invention, a method for viewing a video stream from large data files with high ratio in and out zoom and/or pan without image degradation and with high speed of image presentation and manipulation is disclosed. This method includes storing temporally sequential image sections of the digital files in tiled and overlapping format in a storage drive and streaming temporally sequential image data to a display without substantial computer operating system intervention, wherein panning or zooming results in switching to a different video segment, switching occurs within a display refresh interval.

This method can also include performing a single seek and a single read operation on the storage device to access a selected video segment for streaming to the display. In addition, in this method the temporally sequential image sections may be formatted into a video segment. Still further the method may include storing each tile at a disk block boundary.

In another embodiment of the invention, an apparatus for viewing a video stream from large digital data files with high ratio in and out zoom and/or pan without image degradation and with high speed of image presentation and manipulation is disclosed. This apparatus includes means for storing temporally sequential image sections of the digital files in tiled and overlapping format in a storage drive, and means for streaming temporally sequential image data to a display without substantial computer operating system intervention, wherein the streaming is performed so that display interrupts are applied to allow accumulation of information and change of a display image occurs during intervals.

In the apparatus, the temporally sequential image sections may be formatted into a video segment and each tile of each image section may be stored at a disk block boundary on the storage drive. Further, the video may be encoded with motion compensation to compress a size of the video. In addition, the storage drive may be formatted to store a plurality of videos as a plurality of fixed length records of equal length for optimized retrieval, wherein at least two of the videos have different sizes. Also, the storage drive may be formatted to store a plurality of variable length videos as a plurality of variable length records for optimized retrieval.

The apparatus may further include means for formatting and storing a reduced resolution dataset for each image section. The apparatuses the means for storing image sections can include a disk drive having blocks, wherein the blocks are formatted so that a video segment size is an integer multiple of block size.

In a still further embodiment of the invention a method for viewing a video stream from large data files with high ratio in and out zoom and/or pan without image degradation and with high speed of image presentation and manipulation is disclosed. The method includes storing temporally sequential image sections of the digital files in tiled and overlapping format in a storage drive, and streaming temporally sequential image data to a display without substantial computer operating system intervention, wherein display interrupts are applied to allow accumulation of information and change of a display image occurs during intervals, and wherein the image sections are stored in blocks and wherein each block is formatted to be half of a tile width size. This method can include the performance of one seek at a beginning of the video segment and reading the whole tile.

In another embodiment of the invention, an apparatus for viewing videos from large data files with high ratio in and out zoom and/or pan without image degradation and with high speed of image presentation and manipulation is disclosed. The apparatus includes a storage device that stores temporally sequential image sections of the digital files in tiled and overlapping format contiguously in a storage drive, and a streaming device that transfers the temporally sequential image sections to a display without substantial computer operating system intervention.

Other objects, features and aspects of the invention will become apparent from the following detailed description, the accompanying drawings, and the appended claims.

BRIEF DESCRIPTION OF THE DRAWINGS

The novel features that are considered characteristic of the invention are set forth with particularity in the appended claims. The invention itself; however, both as to its structure and operation together with the additional objects and advantages thereof are best understood through the following description of the preferred embodiment of the present invention when read in conjunction with the accompanying drawings, wherein:

DETAILED DESCRIPTION

While the invention has been shown and described with reference to a particular embodiment thereof, it will be understood to those skilled in the art, that various changes in form and details may be made therein without departing from the spirit and scope of the invention.

Figure 1:
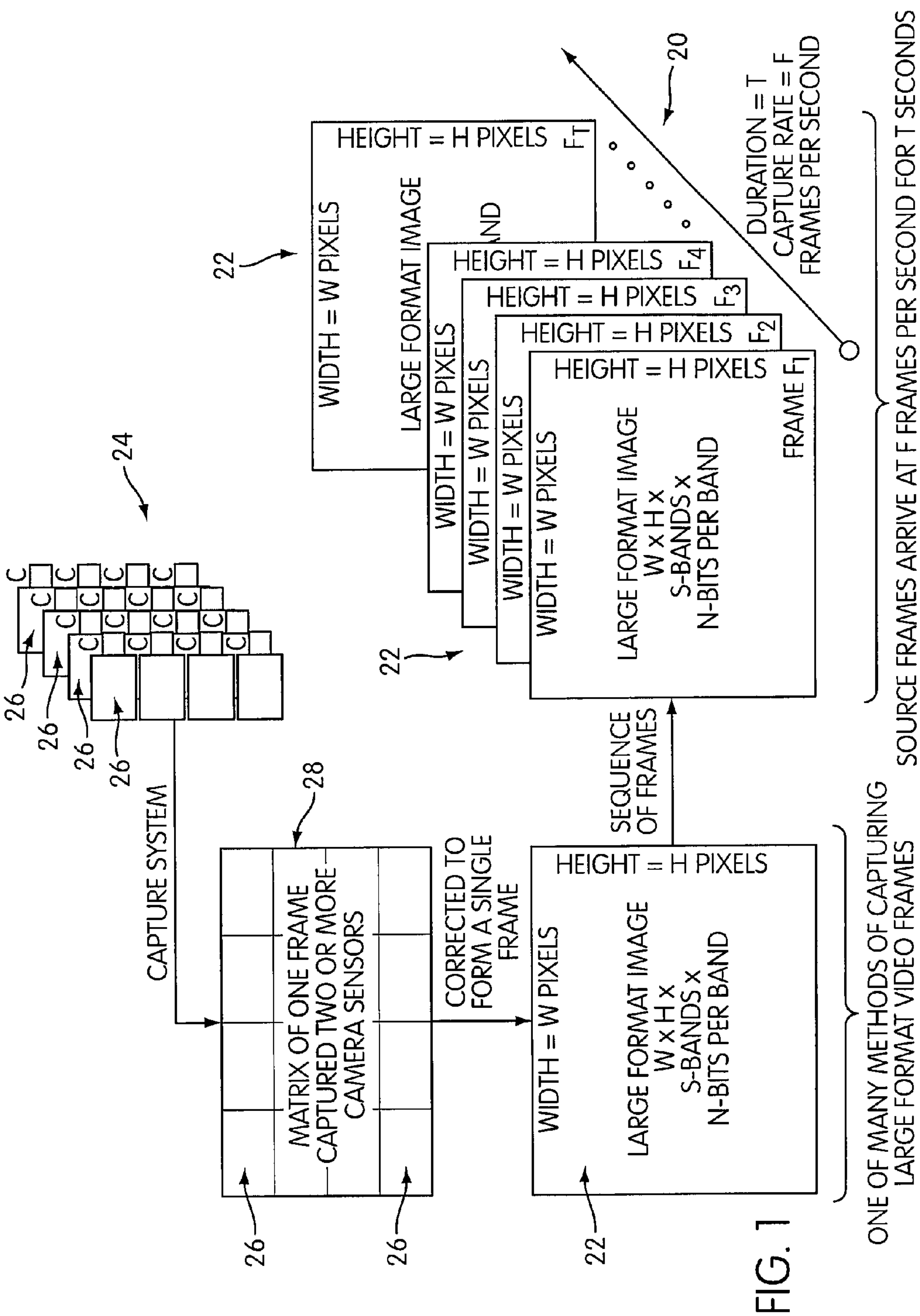
FIG. 1 illustrates an example of how a very large format video may be captured and set as a temporal sequence of a finite number of very large frames of the order of many thousands of pixels wide by many thousands of pixels tall for a mega-pixel or a giga-pixel image according to one embodiment of the present invention.

FIG. 1 illustrates an example of how a very large format video 20 may be captured and configured as a temporal sequence of a finite number of very large frames 22. A plurality of very large frames 22 is shown forming video 20. The plurality of very large frames 22 are identified sequentially as $F_1$-$F_T$, where T is the duration of the period during which very large frames 22 are captured. Each very large frame has a size on the order of many thousands of pixels by many thousands of pixels tall for a mega-pixel or a giga-pixel image according to one embodiment of the present invention. An example of a very large frame would be a 5000 pixel by 5000 pixel of a 25 mega-pixel frame. Another example of a very large frame would be a 33,333 pixel by 33,333 pixel frame of a 1 giga-pixel frame. A temporal sequence of a plurality of these very large frames 22 forms video 20.

Several methods and systems are available to capture a video 20 of a sequence of very large frames 22. One exemplary system, illustrated in FIG. 1, is a large camera array 24 that utilizes a plurality of individual cameras signified by boxes adjacent to the letter C. In this exemplary drawing, Camera array 24 is shown to have four columns of cameras, with each column having four cameras. The use of sixteen cameras to form array 24 is merely exemplary. Any number of cameras may be used for camera array 24. For example, a single large sensor could capture each very large frame 22 as s single frame. Camera array 24 is a simplified capture mechanism for very large frames 22 that is merely provided as a non-limiting example. Each individual camera captures an image 26 that is a fraction of what will become one of the very large frames 22. Each image 26 is combined into an image matrix 28 based upon the position of each individual camera in order to form a contiguous image. The image matrix 28 is corrected to form a single very large frame 22. Very large frame 22 has a width of W pixels and a height of H pixels. Each very large frame has B-bands with N-bits per band. Bands are channels of electromagnetic information. For example, a black and white image has one band. Color images have three bands: red, green and blue. Some images may include a fourth band where the fourth band is infra-red. Satellite images may include seven bands. These images are captured by cameras 24 that have N-bit sensors. For example, an 8-bit sensor will enable camera 24 to resolve 255 voltage levels of intensity. A 12-bit sensor would enable camera 24 to resolve 1024 voltage levels of intensity. Various medical sensors may have 16-bit sensors. Other systems besides camera array 24 may be used to capture and record very large frames 22. For example, a single very large sensor may be used to generate a very large frame 22.

Very large frame 22 is an image of a single place at a single point of time. A series of very large frames 22 taken at different points of time can provide a video 20 of that place. Thus, video 20 is formed of a temporal sequence of very large frames 22, which in this case are identified as $F_1$-$F_T$. Very large frames 22 are captured at a rate of F frames per second for a duration T of time. This method of capturing images 26 and forming very large frames 22 allows for the creation of very large format video 20.

Figure 2:
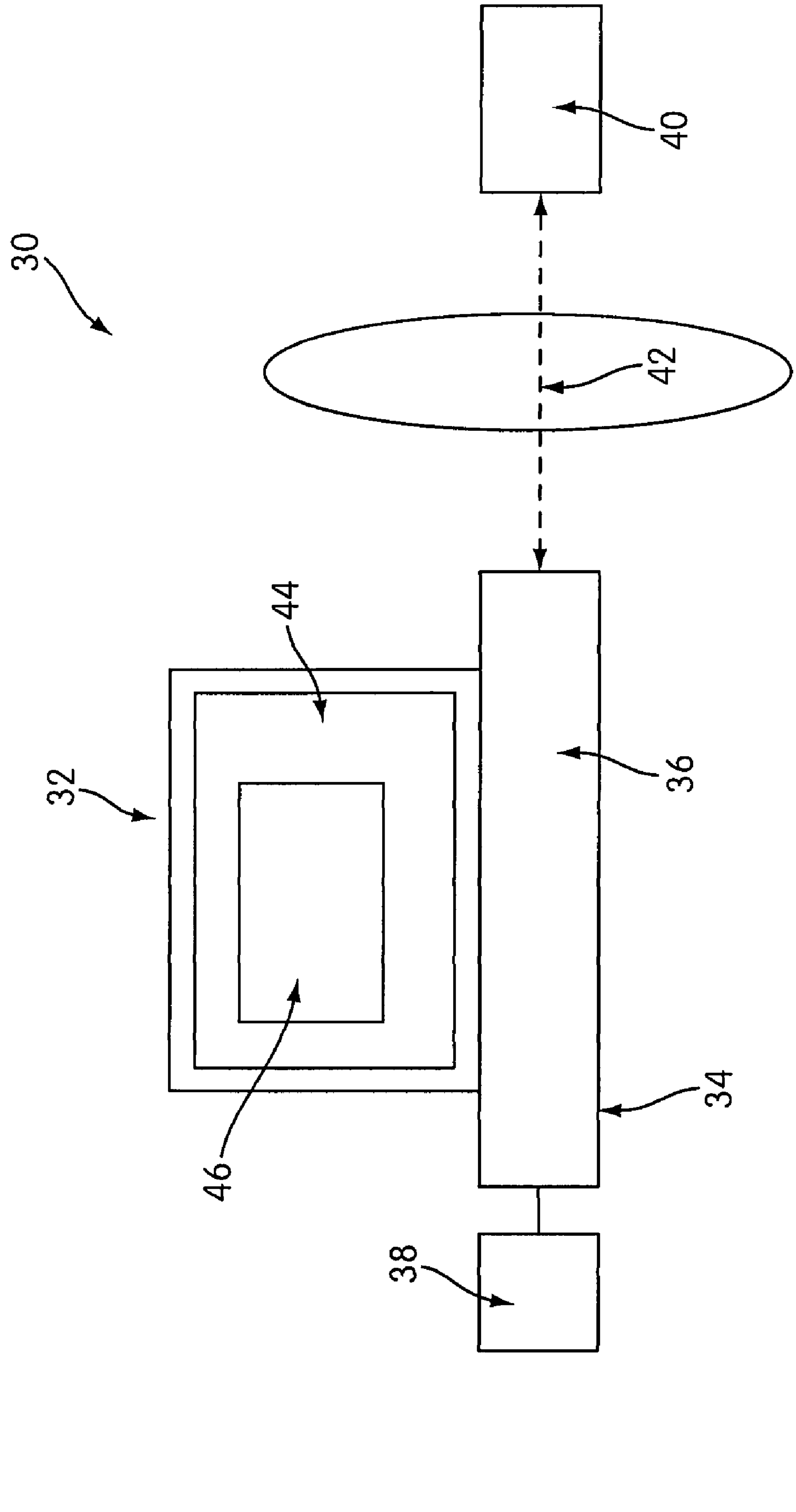
FIG. 2 illustrates a system for displaying very large format video according to one embodiment of the present invention.

FIG. 2 illustrates one exemplary system 30 for displaying very large format video 20 according to one embodiment of the present invention. System 30 includes a video display 32, a computer 34, and storage drive 36. Video display 32 is a conventional video monitor is a piece of electrical equipment which displays viewable images generated by computer 34. Video display 32 is usually either a cathode ray tube or some form of flat panel such as a TFT LCD. Video display 32 typically includes a display device, circuitry to generate a picture from electronic signals sent by computer 34, and an enclosure or case. Within computer 34, either as an integral part or a plugged-in interface, there is circuitry to convert data, such as information for very large frames 22 and video 20, to a format compatible with display 32. Storage drive 36 stores the data for very large frames 22 and video 20. Data formats for storing very large frames 22 and video 20 are discussed later in the application with respect to FIGS. 11-13.

Storage drive 36 may take the form of any device or structure used to store information including, but not limited to, magnetic storage media, optical storage media, static and dynamic solid state memory, and other data storage devices. Storage drive 36 may be contained internally with computer 34. Alternatively, storage drive 36 may be contained in an external storage device 38. Further, storage drive 36 may be housed within a remote data storage device 40 that is accessible to computer 34 through a network 42, such as a Local Area Network (LAN) or a public network such as the Internet.

Two parameters that describe display 32 are display resolution and aspect ratio. Display resolution is the number of distinct pixels in each dimension that can be displayed on display 32. Aspect ratio is the horizontal size of display 32 compared to the vertical size. For example, display 32 may have a 4:3 aspect ratio, which is the standard aspect ratio, so that display 32 has a screen 44 with a width of 1024 pixels and a height of 768 pixels. A widescreen display 32 having an aspect ratio of 16:9, means screen 44 is 1024 pixels wide and has a height of 576 pixels.

System 30 is configured to display videos 20 on display 32. The entire screen 44 may display a section of very large frame 22. Alternatively, only a portion of screen 44 may be used to display a section of very large frame 22. Other portions of screen 44 may be dedicated to various software controls used to operate system 30 and manipulate videos 20. The area of screen 44 that displays very large frame 22 is termed the viewport 46. The viewport 46 has a size defined in pixels, where the height of the viewport in pixels is $D_h$ and the width of $D_W$. Thus, in addition to being an area of screen 44, viewport 46 also corresponds to an area of very large frame 22 that is capable of being shown on screen 44.

Figure 3:
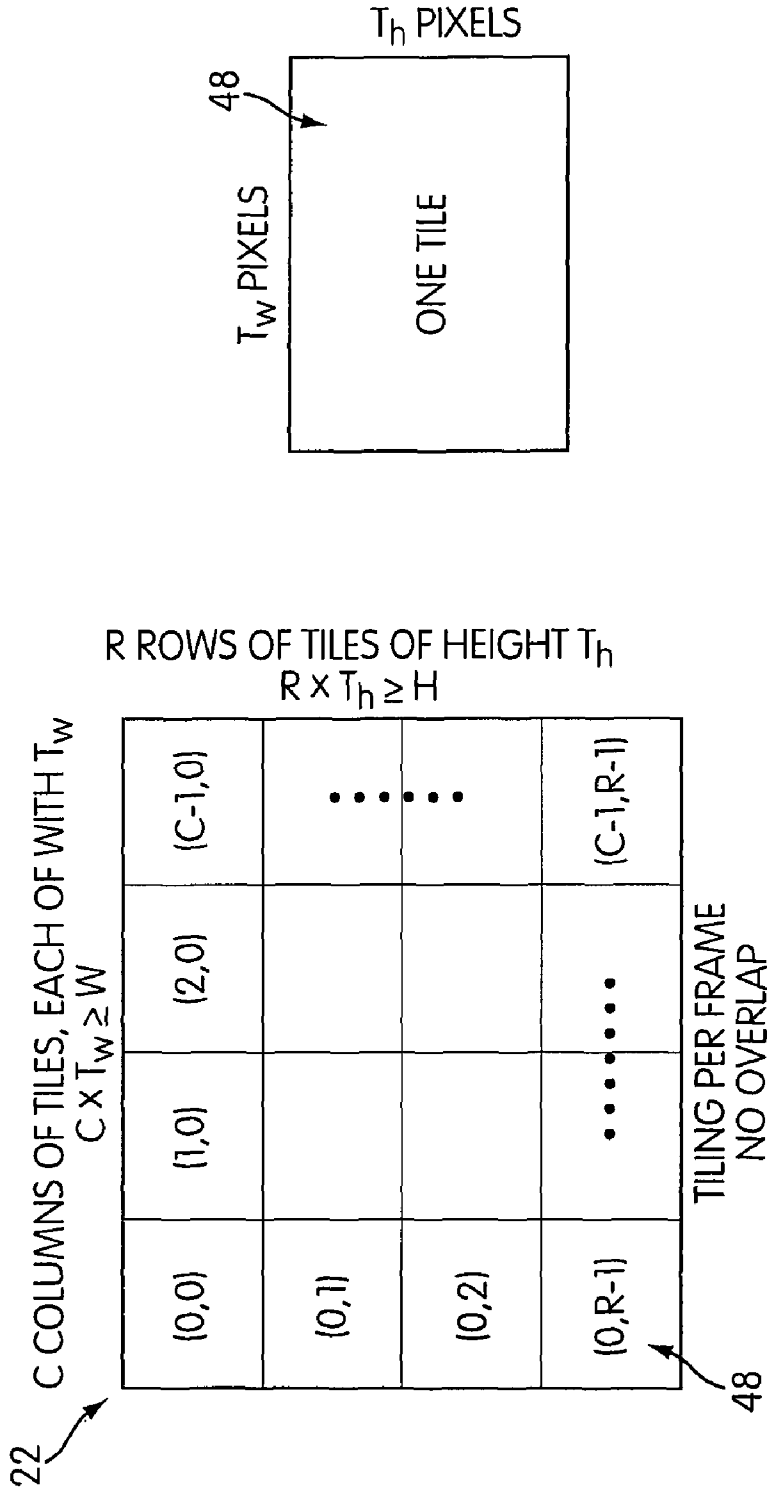
FIG. 3 illustrates an example of how a very large frame is composed of a matrix of tiles according to one embodiment of the present invention.

FIG. 3 illustrates an example of how a very large frame 22 is composed of a matrix of tiles 48 according to one embodiment of the present invention. A single very large frame 22 is W pixels wide and H pixels tall. The very large frame 22 has B-bands that are laid out in a band-sequential or band-interleaved manner. Each band has N-bits per band. The data type of each band depends upon the capture device used, such as camera array 24.

An exemplary single very large frame 22 is composed of a matrix of tiles 48 organized in rows and columns. Each tile 48 is identified by Cartesian coordinates. So, for example, tile 48 in the first column in the first row has coordinates of (0,0) and the tile 48 in the last column of the last row as coordinates of (C-1, R-1), where C is the number of columns and R is the number of rows in very large frame 22.

In this example, sixteen tiles 48 form very large frame 22. The use of sixteen tiles to form very large frame 22 is merely exemplary. Any number of tiles may form very large frame 22. Each tile 48 is $T_w$ pixels wide and $T_h$ pixels tall such that $C \times T_w \geqq W$ and $R \times T_h \geqq H$ as illustrated in FIG. 3. W is the width of very large frame 22 and H is the height of very large frame 22. It is desirable to show a portion of very large frame 22 on a viewport that has a width, in pixels, of $D_w \leqq (T_w-1)$ and a height, in pixels, of $D_h \leqq (T_h-1)$. When displaying a portion of very large frame 22 on display 32 having a width and height of $D_w$ and $D_h$, one, two, or four adjacent tiles 48 may be required to completely fill the viewport 46. Note that none of the tiles 48 in very large frame 22 overlap in this example.

Very large frame 22 is displayed on display 32 by means of system 30 configured to archive, store, and retrieve tiles 48 described in FIG. 2. As described more fully in FIGS. 11-13, each tile 48 is stored separately as a contiguous file in storage drive 36. Having to display more than one tile 48 to fill the display has numerous performance disadvantages for system 30. System 30 is at optimal performance when it has to retrieve and display a single tile 48 only to fill viewport 46. When system 30 has to retrieve more than one tile 48 to fill viewport 46, system 30 has to dedicate more resources and spend more time processing additional information than if system 30 had to retrieve minimum amount of information by accessing a single tile 48 only.

When viewing very large frame 22 that has no overlapping tiles 48, it would be possible to retrieve a single tile 48 for display only when a user is viewing a region at the center of that tile 48. However, if the user desired to look at an edge portion of that tile 48, system 30 might have to display an additional tile 48 in viewport 46. If the user desired to look at a corner portion of one tile 48, system 30 might have to display three additional tiles 40 in viewport 46. When looking at edge or corner portions of a single tile 48, it is possible to avoid the need to retrieve additional tiles 48 to fill viewport 46 by creating overlapping tiles.

The overlapping of tiles 48 along each row and column over very large frame 22 enables the storage and retrieval of a single tile 48 that is $T_w$ pixels wide and $T_h$ pixels high that contains the desired viewport 46 that is $D_w$ pixels wide and $D_h$ pixels tall, where $D_w \leqq (T_w-1)$ and $D_h \leqq (T_h-1)$. Thusly, when a user moves toward the edge or corner of a first tile 48 of a very large frame 22, there is an overlapping tile 48 in which the edge or corner of the first tile 48 is the center of the overlapping tile 48. Thus, instead of having to display multiple tiles 48 to fill viewport 46, it is possible to select the overlapping tile 48. The amount of overlap is adjustable and varies from 0 to 100 percent.

Figure 4:
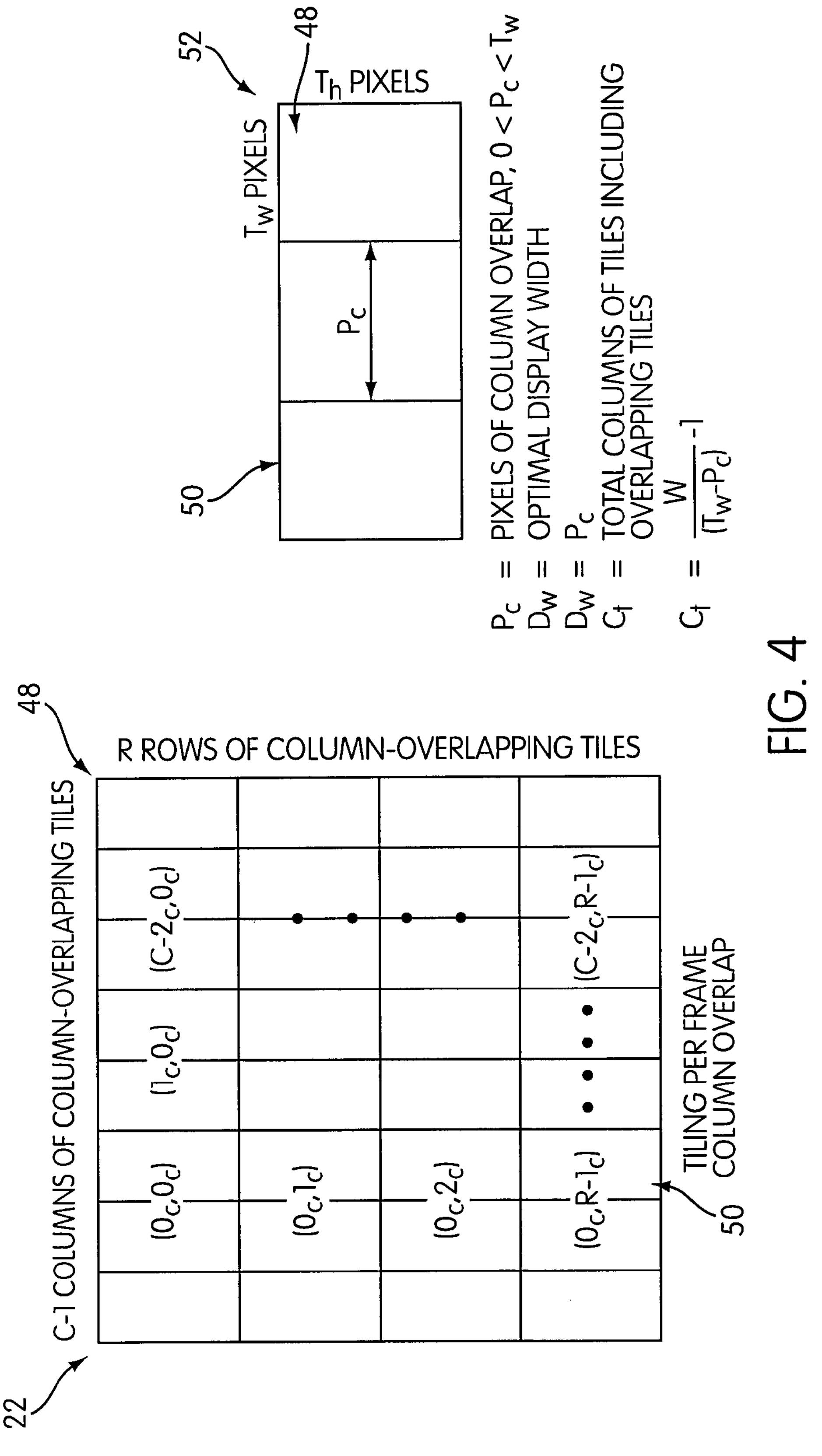
FIG. 4 illustrates how columns of tiles are overlapped in a very large frame according to one embodiment of the present invention.

FIG. 4 illustrates how columns of tiles 48 are overlapped in a very large frame 22 according to one embodiment of the present invention. With reference to FIG. 4, a very large frame 22 is shown. Very large frame 22 is configured to have R rows of tiles 48 and C columns of tiles 48. As in FIG. 4, tiles 48 are identified by Cartesian coordinates. In addition, very large frame 22 is also configured to have C-1 columns of column-overlapping tiles 50. Column-overlapping tiles 50 are illustrated as being rectangles having solid border lines which are laid over tiles 48. Very large frame 22 is shown, in this example, to have three columns of column-overlapping tiles 50 and four columns of tiles 44. The use of four columns and three overlapping-columns is merely exemplary. Very large frame 22 is configured in this example to optimally display a viewport 46 having a width of $D_w=(T_w/2)$. In this example, for a very large frame having C columns, C-1 columns 48 are required for a $T_w/2$ overlap.

A pair of column-overlapping tiles 52 is also shown in FIG. 4. A single tile 48 is overlapped with an overlapping tile 50. The amount that tiles 48 and 50 overlap is designated by $P_c$, where $0<P_c<T_w$. Overlapping portion $P_c$ is adjustable in size. The overlapping portions of tiles 48 and 50 include substantially identical pixel data. $D_w$ is the display width of viewport 46. Ideally, $D_w=P_c$, thereby enabling computer system 30 to retrieve and display a single tile 48 or 50 on to display 32 and fill the entire viewport 46 without the need to retrieve and display other tiles 48 or 50 simultaneously. The total number of columns, both columns of non-overlapping tiles 48 and overlapping-columns of column-overlapping tiles 50, is designated by $C_t$, where $C_t=[W/(T_w-P_c)]-1$. Column-overlapping tiles 50 provide overlapping coverage for the vertical regions where tiles 48 abut each other. However, column-overlapping tiles 50 do not provide overlapping coverage for the horizontal regions where tiles 48 abut each other.

Figure 5:
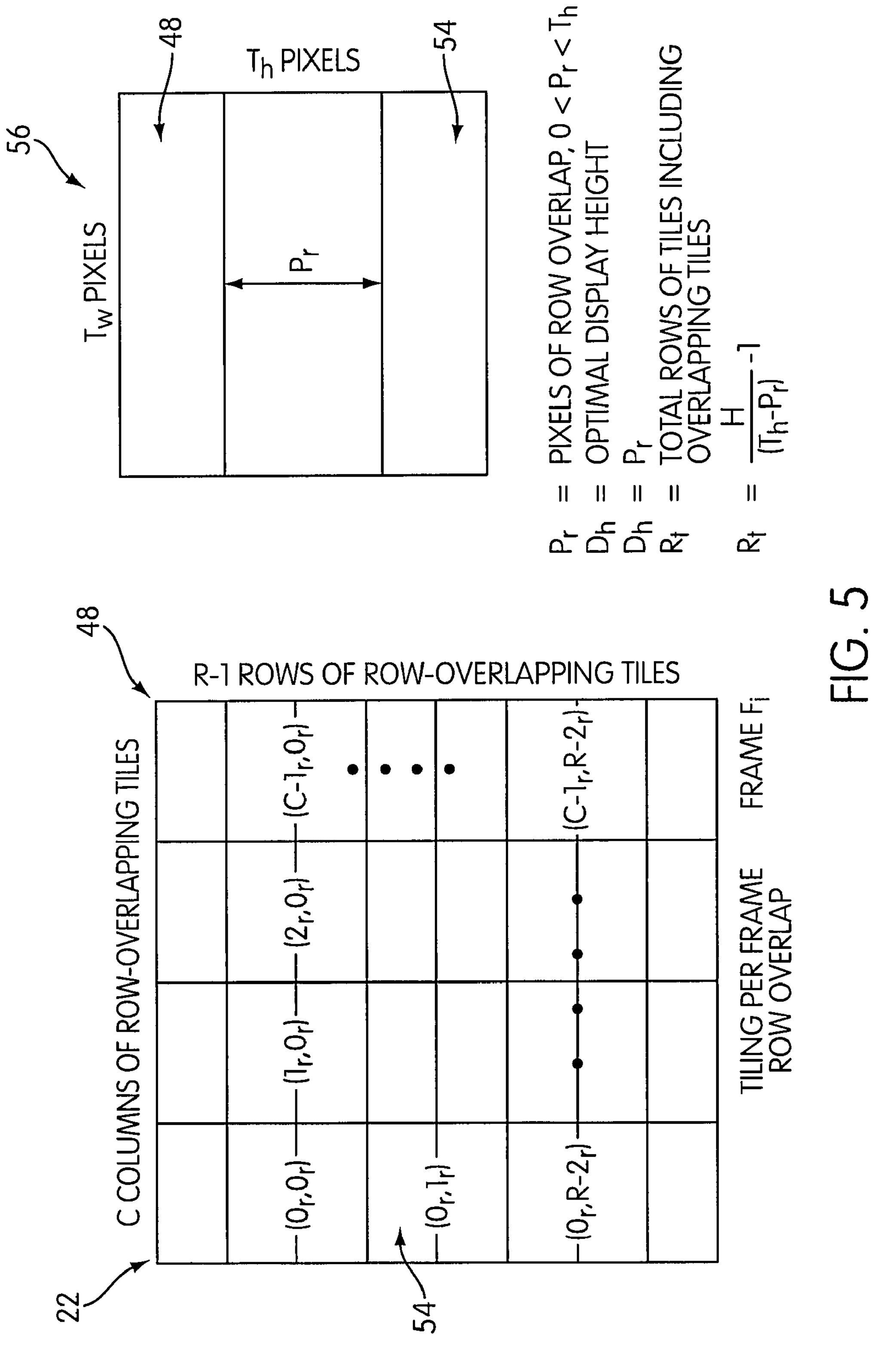
FIG. 5 illustrates how rows of tiles are overlapped in a very large frame according to one embodiment of the present invention.

FIG. 5 illustrates how rows of row-overlapping tiles 54 are overlapped in a very large frame 22 according to one embodiment of the present invention. Very large frame 22 is configured to have R rows of tiles 48 and C columns of tiles 48. In addition, very large frame 22 is configured to have R-1 rows of row-overlapping tiles 54. In this example, tiles 48 are shown having dashed lines and row-overlapping tiles 64 are shown having solid lines. Very large frame 22 is configured in this example to have overlapping rows of tiles 48 and 54 to optimally display a viewport having a width of $D_h=(T_h/2)$. Thus, for very large frame 22 having R rows, R-1 additional rows of row-overlapping tiles 54 are required to form a $T_h/2$ overlap. The display height $D_h$ of viewport 46 is given by $0<D_h<T_h$.

A pair of overlapping-tiles 56 is shown at right in FIG. 5. Overlapping-tiles 56 is formed by tile 48 being overlapped by row-overlapping tile 54. The amount of overlap is given by $P_r$, where $P_r$ is the pixels of row overlap and $0<P_r<T_h$. Overlapping portion $P_r$ is adjustable in size. The overlapping portions of tiles 48 and 54 include substantially identical pixel data. Ideally, $D_h=P_r$ for this example, thereby enabling system 30 to retrieve and display a single tile 48 or 54 on to display 32 and fill the entire viewport 46 without the need to retrieve and display other tiles 48 or 54 simultaneously. The total number of rows of tiles 48 and 54 in very large frame 22 is designated by $R_t$, where $R_t=[H/(T_h-P_r)]-1$. Row-overlapping tiles 54 provide overlapping coverage for the horizontal regions where tiles 48 abut each other. However, row-overlapping tiles 54 do not provide overlapping coverage for the vertical regions where tiles 48 abut each other.

Figure 6:
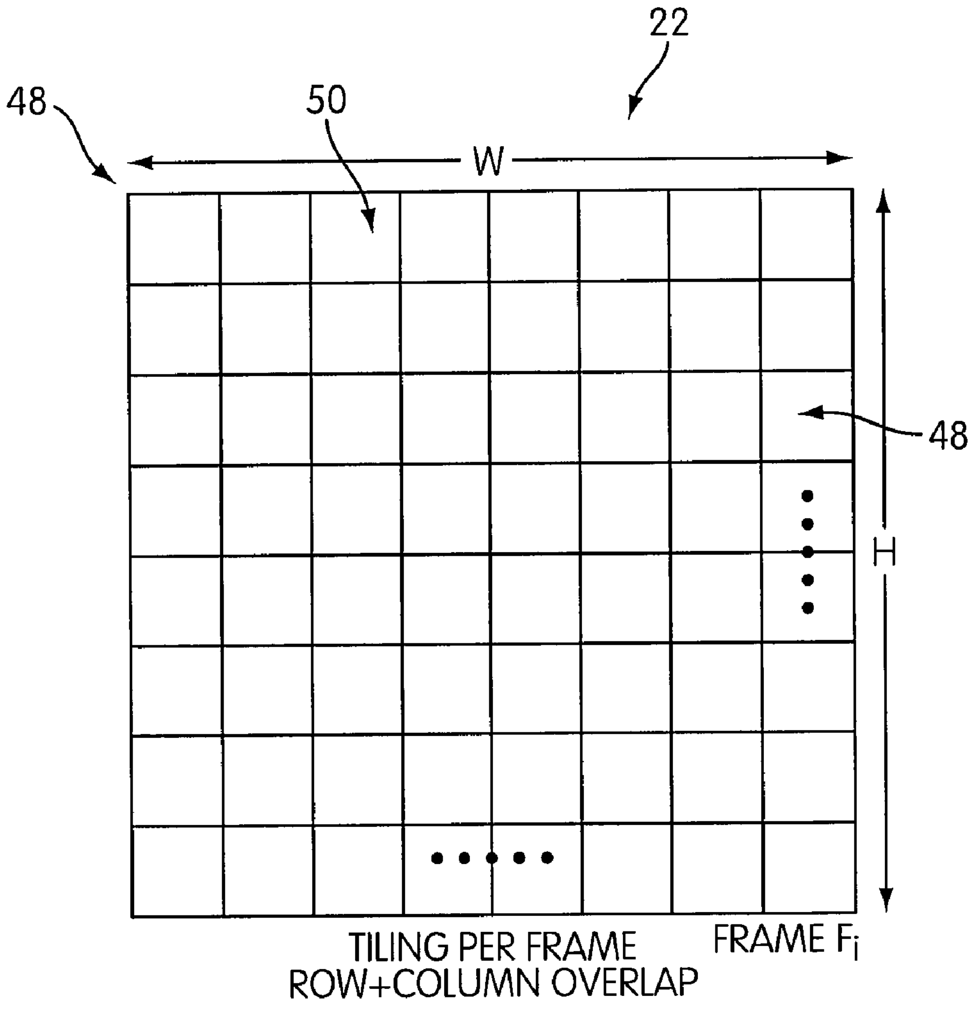
FIG. 6 illustrates an example of a very large frame that is configured to have both overlapping rows of tiles and overlapping columns of tiles according to one embodiment of the present invention.

FIG. 6 illustrates an example of a very large frame 22 that is configured to have both overlapping rows of tiles 54 and overlapping columns of tiles 50 according to one embodiment of the present invention. By having both overlapping rows and overlapping columns, very large frame allows for the display of any viewport 46 within very large frame 22 within a single tile 48, 50 or 54 provided that viewport 46 is no larger than the overlap width and height of any of tiles 48, 50 or 54.

FIG. 4 illustrated a very large frame 22 having column-overlapping tiles 50. FIG. 5 illustrated a very large frame 22 having row-overlapping tiles 54. The embodiments having row-overlapping tiles 54 and column-overlapping riles 50 are merged into very large frame 22 shown in FIG. 6 that has both row and column-overlapping tiles 54 and 50. In this example, $D_w=P_c=T_w/2$ and $D_h=P_r=T_h/2$, thereby enabling system 30 to retrieve and display a single tile on to display 32 and fill the entire viewport 46 without the need to retrieve and display other tiles 48, 50 or 54 simultaneously. Very large frame 22, having both row-overlapping tiles and column-overlapping tiles 54 enables any display viewport 46 to be contained within a single tile 48, 50 or 54 provided that the display viewport 46 is no larger than the overlap width or height $P_c$ and $P_r$.

Figure 7:
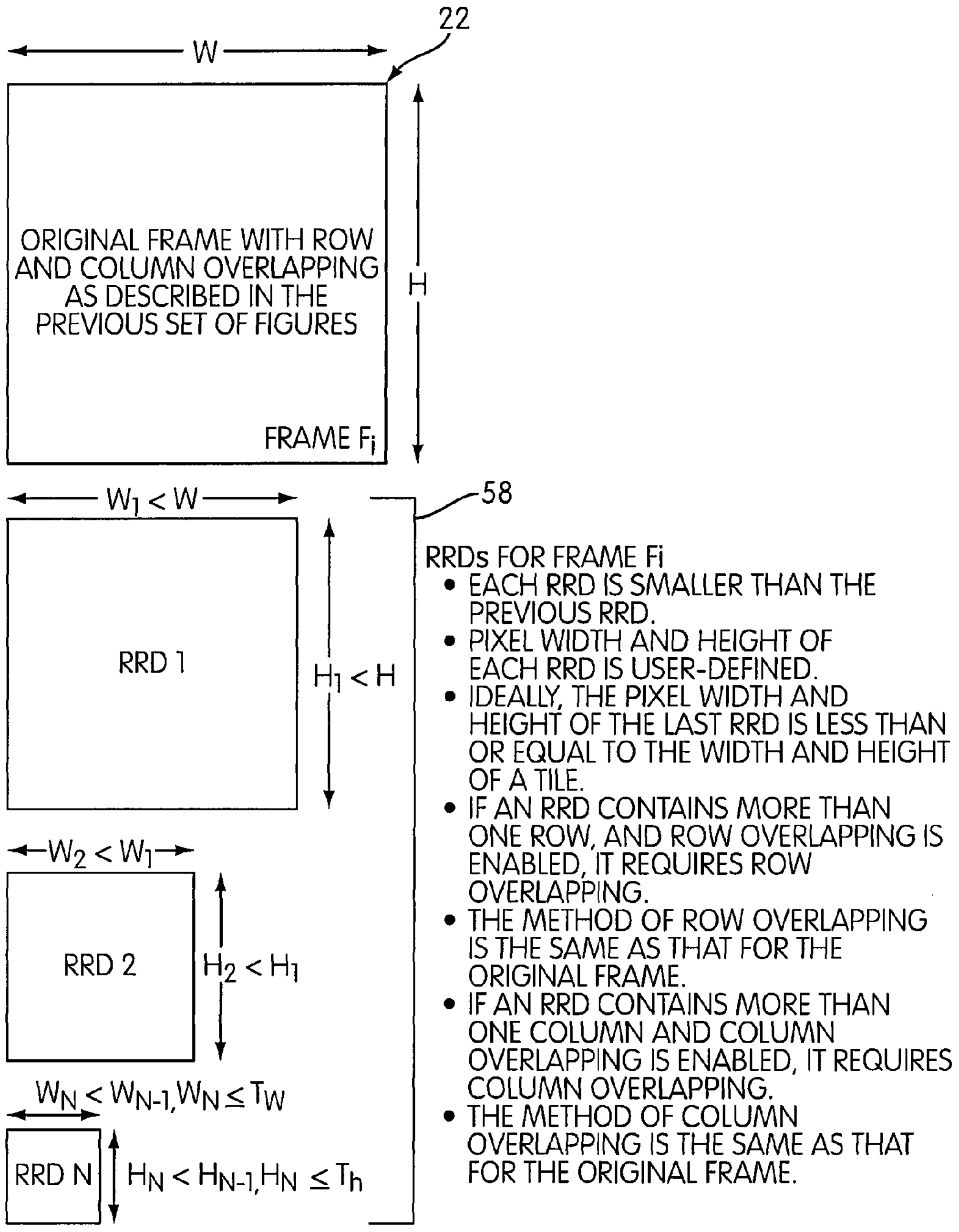
FIG. 7 illustrates an example of Reduced Resolution Datasets (RRDs) for a very large frame having overlapping tiles according to one embodiment of the present invention.

FIG. 7 illustrates an example of Reduced Resolution Datasets (RRDs) 58 for a very large frame 22 configured to have both row-overlapping tiles 54 and column-overlapping tiles 50 according to one embodiment of the present invention. FIG. 1 illustrated how a very large video 10 could be captured by a camera array 24 as a sequence of very large frames 22. FIGS. 2-5 illustrated how very large frames 22 are configured as an array of tiles 48, 50 and 54. FIGS. 3, 4 and 5 also illustrated how it is possible, through the use of tile overlapping, to display portions of a very large frame 22 on a display with a single tile 48, 50 and 54 to optimize performance of system 30. Tile overlapping allows for a user to move viewport 46 around very large frame 22 and view different portions of very large frame 22 at one single resolution. RRDs 58, illustrated in FIG. 7, allow for the user to vary the resolution of the image viewed in viewport 46, thereby allowing the user to zoom in and out of viewing portions of very large frame 22.

FIG. 7 illustrates a very large frame 22 having row-overlapping and column-overlapping tiles 50 and 54 as illustrated in FIGS. 4, 5 and 6. FIG. 7 also illustrates N RRDs 58 computed for very large frame 22, identified as RRD 1, RRD 2 and RRD N. RRDs 58 are each an image frame that covers the same visual area as very large frame 22, but at a lower resolution, and hence having fewer pixels, thereby allowing a greater portion of the image in very large frame 22 to be viewed at a single time in viewport 46. By having a lower resolution and fewer pixels, each RRD 58 has less data than very large frame 22. The reduction in pixels for each RRD 58 is precomputed, such that each RRD is precomputed and stored in storage drive 36 prior to viewing, as opposed to having computer 34 calculate a zoom ratio in real time while the user is viewing very large frame 22.

Very large frame 22 has a width of W and a height of H, measured in pixels. RRD 1 has a width of $W_1$ and a height of $H_1$, also measured in pixels, where $W_1<W$ and $H_1<H$. By having $H_1$ and $W_1$ lower than W and H, RRD 1 has fewer pixels and hence a lower resolution than very large frame 22, thereby allowing display 32 to show a larger viewport 46 of the image captured in very large frame 22 than is possible with very large frame 22 directly.

RRD 2 has a width of $W_2$ and a height of $H_2$, measured in pixels, where $W_2<W$ and $H_2<H_1$. By having $H_2$ and $W_2$ lower than W and H, RRD 2 has fewer pixels and hence a lower resolution than very large frame 22, thereby allowing display 32 to show a larger viewport of the area capture in very large frame 32 than is possible with RRD 1 directly. Similarly, RRD N has a width of $W_N$ and a height of $H_N$, measured in pixels, where $W_N<W_{N-1}$, $W_N \leqq T_W$ and $H_N<H_{N-1}$, $H_N \leqq T_h$. Each RRD 58 is smaller than the previous RRD 58. The pixel width and height of each RRD 58 is user-defined, or may be preprogrammed.

Each RRD 58 is composed of tiles 48 in the same configuration and manner as with very large frames 22 as described in FIG. 4. Where an RRD 58 has more than one row or one column of tiles 48, RRD 58 is configured to correspondingly have row-overlapping tiles 54 and/or column-overlapping tiles 50. The method of having overlapping tiles 50 or 54 in overlapping rows and/or columns for RRDs 58 is carried out in the same as manner for very large frame 22, as outlined in FIGS. 5 and 6. Ideally, the pixel width and height of the last RRD 58 is less than or equal to the width and height of a single tile 48, 50 or 54. While RRDs 58 may have row-overlapping tiles 54 and/or column-overlapping tiles 50, it is possible a user may desire not to have overlapping rows and/or columns to conserve storage space in storage drive 36. In this example, a user may therefore be able to disable the creation of overlapping rows and/or columns for RRDs 58 with software supported by computer 34 or network 42. Creating RRDs 58 of very large frame 22 enable a user to zoom in and out of viewing portions of very large frame 22 within viewport 46. By creating RRDs 58 that have row-overlapping tiles 54 and/or column-overlapping tiles 50, when the RRD 58 is large enough to have more than one row and/or column, it is possible for the entire portion of viewport 46 to be filed with a single tile 48, 50 or 54 regardless of the place on RRD 58 that the user wishes to view. As a result of requiring the retrieval and display of a single tile 48, 50 or 54 only, the performance of system 30 is optimized.

Figure 8:
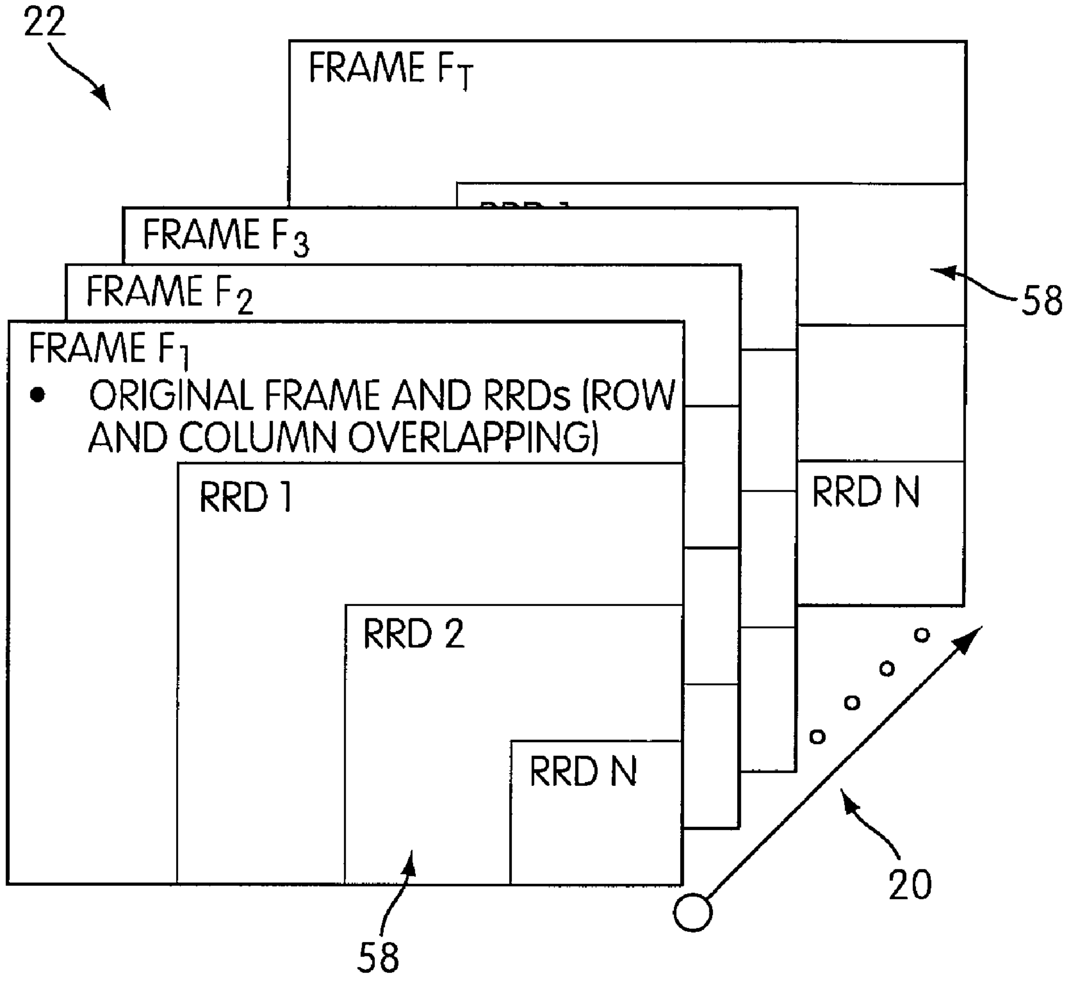
FIG. 8 illustrates a layout of all frames in a video, which includes an original frame and a plurality of RRDs, each having overlapping rows and columns according to one embodiment of the present invention.

FIG. 8 illustrates a layout of all frames in a video 20, which includes a plurality of very large frames 22 and a plurality of RRDs 58, each of which is configured to have overlapping rows and columns of tiles 48, 50 and 54 according to one embodiment of the present invention. FIG. 8 illustrates a combination of the very large frame 22 configurations depicted in FIGS. 1 and 3-7. FIG. 8 shows a plurality of very large frames 22, which include frames $F_1$ through $F_T$. Each frame $F_1$ through $F_T$ is configured to have overlapping rows and columns of tiles as depicted in FIGS. 4-6. Further, each frame $F_1$ through $F_T$ is configured to have N RRDs 58 as depicted in FIG. 7, identified as RRD 1 through RRD N. Each RRD 58 has successively lower resolution and fewer pixels than the previous RRD 58. However, each RRD 58 captures the entire image area as pictured in the previous RRD 58 and the very large frame 22, albeit at differing resolutions, thereby allowing for a user to zoom in and out of viewing the image captured in very large frame 22.

Very large frames 22, illustrated as $F_1$ through $F_T$, are each taken at succeeding points in time. Thus, very large frames $F_1$ through $F_T$ form a temporal sequence of frames 22, as signified by line 60, which when successively viewed together, form a video or movie 20. Very large frames 22 are configured to form a video 20. Correspondingly, additional videos 20 are formed by each temporal sequence of RRDs 58. For example, the temporal sequence of RRD 1 from each of the very large frames 22 $F_1$ through $F_T$ forms a video 20. Videos 20 are also formed from a temporal sequence of RRD 2 through RRD N. In this manner, it is possible to view a video 20 at varying resolutions and degrees of zoom for very large frame 22 with RRDs 58.

Figure 9:
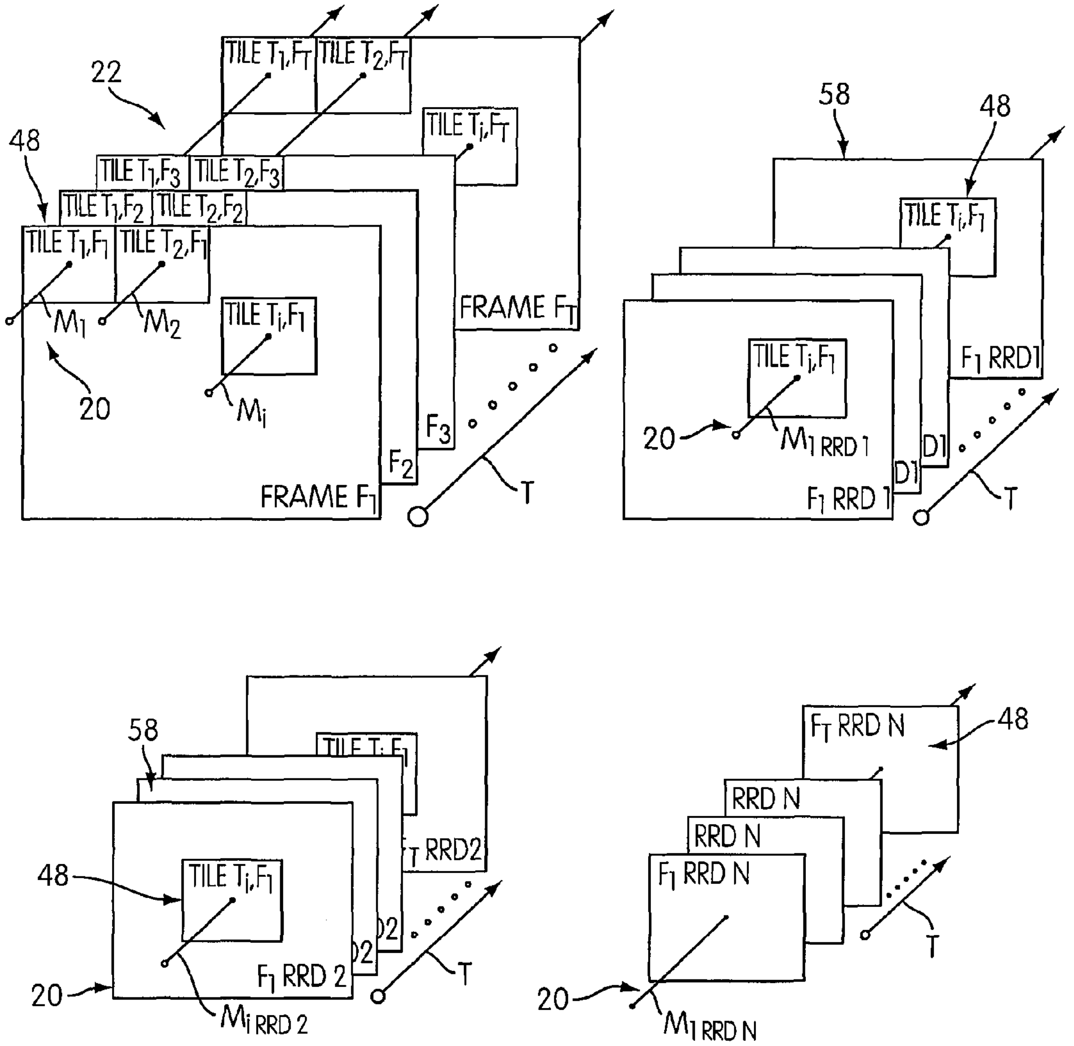
FIG. 9 illustrates a video formed from a temporal sequence of very large frames, which includes all original frames and a plurality of RRDs for all original frames, each having overlapping rows and columns according to one embodiment of the present invention.

FIG. 9 illustrates a plurality of videos 20 formed from a temporal sequence of very large frames 22 and RRDs 58 according to one embodiment of the present invention. Each very large frame 22 is comprised of a plurality of overlapping columns and rows of tiles 48, 50 and 54 as described above to enable a user to pan across very large frame 22 while viewing any area of very large frame 22 in viewport 44 with a single tile 48, 50 or 54. Each very large frame 22 may be configured to have an identical arrangement of tiles 48, 50 and 54. The only difference between various very large frames 22, identified as $F_1$ through $F_T$, is that they were taken at a different point in time. A separate video 20 may then be formed from the temporal sequence of tiles 48, 50, 54 having identical Cartesian coordinates from each very large frame 12 $F_1$ through $F_T$. For instance, a video 20, identified as $M_1$, can be formed from the temporal sequence of tiles $T_1$ from each very large frame 12 $F_1$ through $F_T$. Similarly, videos 20 $M_2$ through $M_T$ can be formed from the temporal sequence of tiles 48, 50 or 54 $T_2$ through $T_i$ from each frame $F_1$ through $F_T$.

As described in FIGS. 7 and 8, each very large frame $F_1$ through $F_T$ is configured to have N RRDs 58. As with very large frames 22, videos 20 may be formed from a temporal sequence of tiles 48, 50 or 54 for each RRD 58. RRD1 for frames $F_1$ through $F_T$ is shown having a video 20, designated $M_i$, made from tiles $T_i$. Similarly, RRD2 for frames $F_1$ through $F_T$ is shown having a video designated Mi, RRD2 made from tiles $T_i$. Lastly, RRD N for frames $F_1$ through $F_T$ is shown having a video 10 designated $M_i$, RRDN made from tiles $T_i$, where RRD N has a size equal to or less than a single tile 48, 50 or 54.

As described in FIGS. 4-6, very large frames 22 are configured to have overlapping rows and columns of tiles 48, 50 and 54 to enable any portion of very large frame 22 to be shown on display 32 with a single tile 48, 50 or 54. Individual videos 20 are made from a sequence of each of these overlapping tiles 48, 50 or 54 having identical Cartesian coordinates. Thus, a video 20 of any portion of very large frames 22 at any desired resolution can be shown on display 32 with a video 20 formed of a temporal sequence of a single tile 48, 50 or 54. Where each video 20 is comprised of a single file stored in storage drive 36, the ability to show a video 10 of any area of very large display 22 by panning across very large display 22 at any level of zoom with RRDs 58 with a temporal sequence of a single tile 48, 50 or 54 optimizes the performance of system 30.

Figure 10:
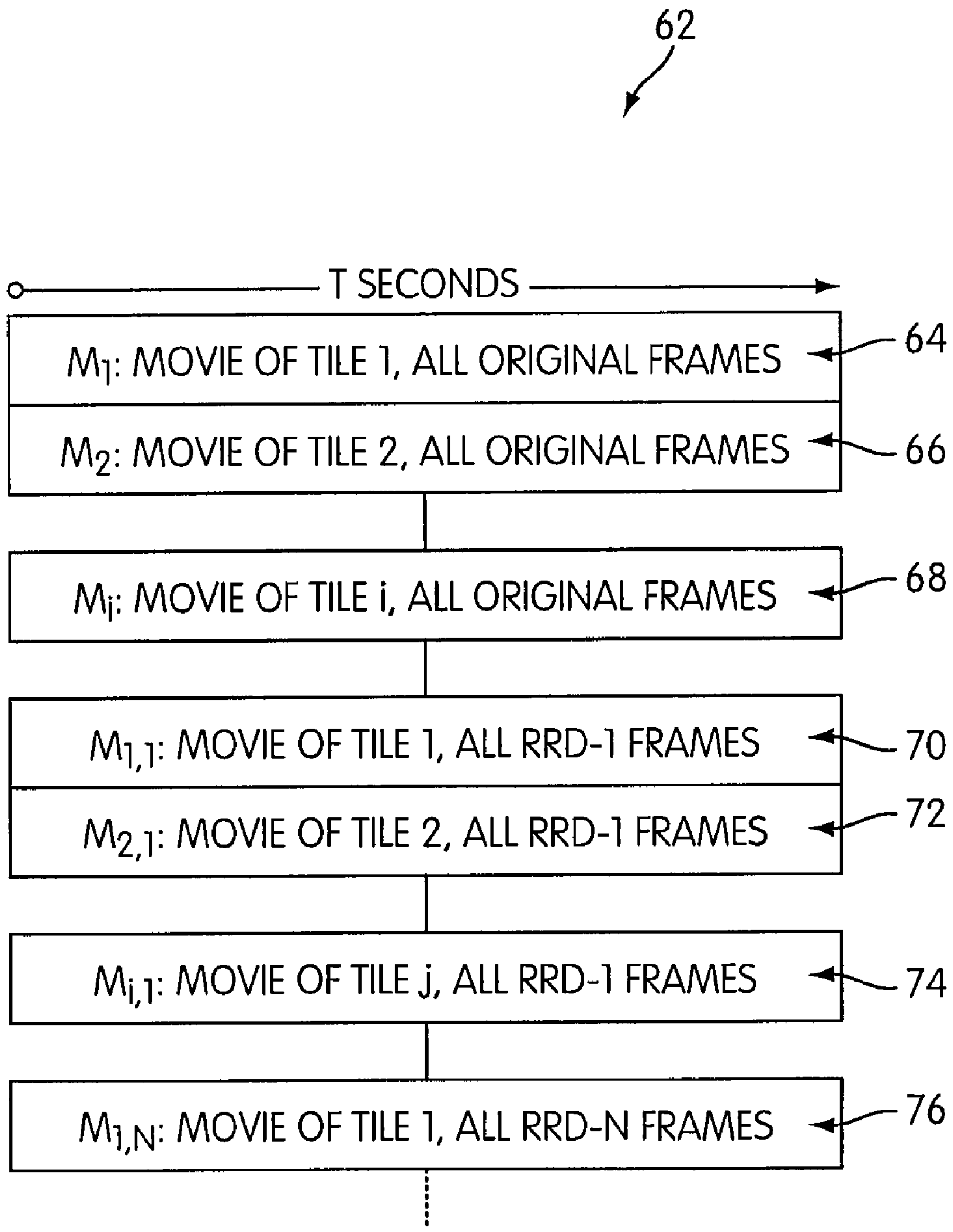
FIG. 10 illustrates a block diagram of a plurality of videos formed of a temporal sequence of tiles according to one embodiment of the present invention.

FIG. 10 illustrates a block diagram 62 of videos 20 formed of a temporal sequence of tiles 48, 50 or 54 according to one embodiment of the present invention. FIG. 20 provides a block diagram of the videos 20 formed in FIG. 9. For all very large frames 22, a video 10 is formed for each individual temporal sequence of tiles 48, 50 or 54 having identical Cartesian coordinates. Very large frame 22 is configured to have tiles $T_1$ through $T_i$, and correspondingly has videos 20 $M_1$ through $M_i$ as shown in blocks 64, 66 and 68. Similarly, for RRD 1, a video 20 is formed of each individual temporal sequence of tiles 48, 50 or 54. RRD 1 is configured to have tiles $T_1$ through $T_j$, and correspondingly has videos 10 $M_1$ through $M_j$ as illustrated in blocks 70, 72 and 74. For RRD N, a video 10 is formed of the tiles 48, and correspondingly has a video 20 $M_1$ as shown in block 76. By forming a video 20 of each temporal sequence of tiles 48, 50 or 54 it is possible to display any portion of a video 20 of very large frame 22, or any RRD 58 thereof, from one video 10 formed of a temporal sequence of a single set of tiles 48, 50 or 54, thereby optimizing the performance of system 30. Any viewport 46 of any RRD 58 that is no larger than the width and height of the overlap of a pair of tiles 48, 50 or 54 is contained within a single video 20.

Figure 11:
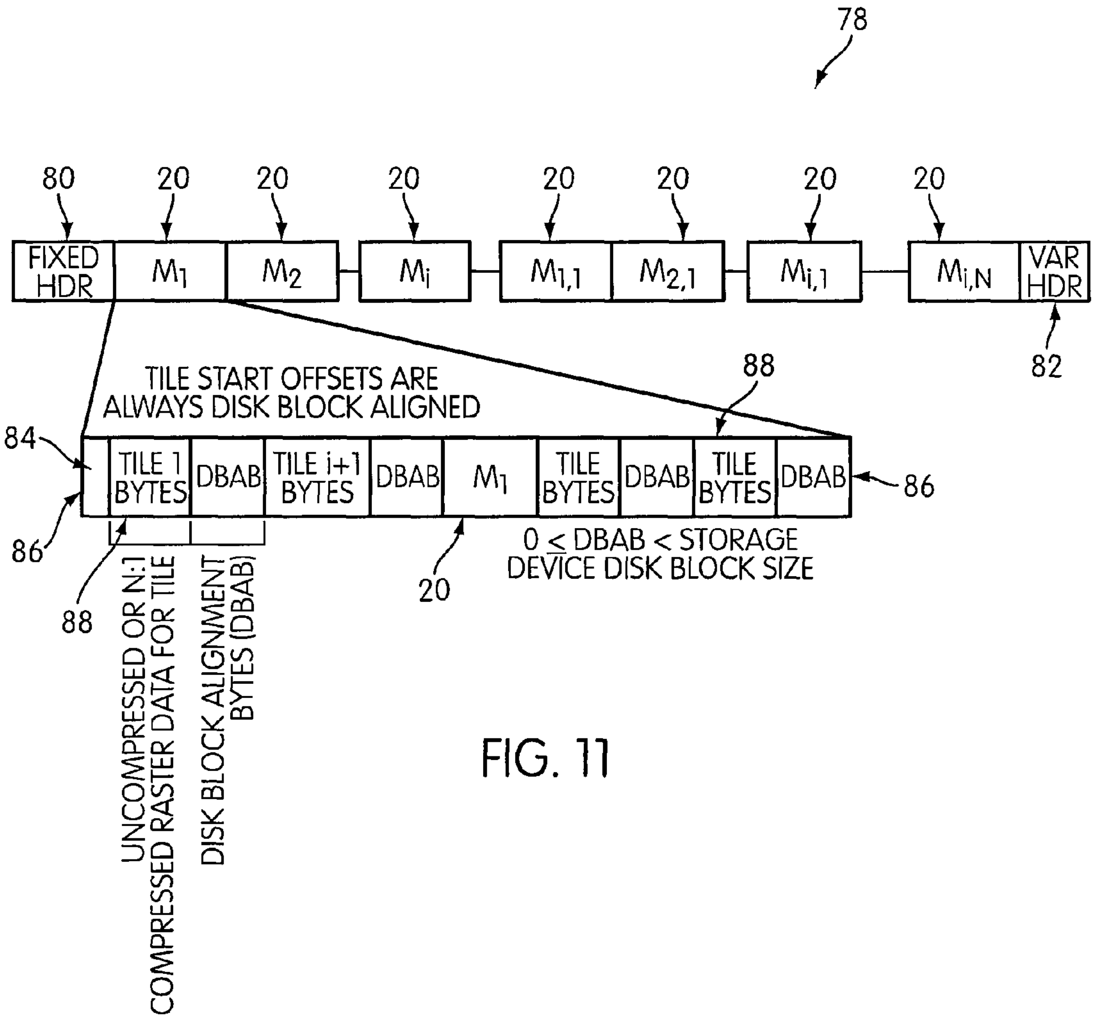
FIG. 11 illustrates a video formed of a temporal sequence of tiles and how it may be stored contiguously inside a single file according to one embodiment of the present invention.

FIG. 11 illustrates a video 20 formed of a temporal sequence of tiles 48, 50 or 54 and how it may be stored contiguously inside a single file 78 according to one embodiment of the present invention. All videos 10 may be stored video sequential or video interleaved format. Storing videos 20 in a video sequential format is defined as storing one video 20 after another such that each video 20 is logically contiguous in the file stored in storage drive 36. Storing videos 20 in a video interleaved format is defined as storing fixed chunks of each video 20 in a logically contiguous manner in the file stored in storage drive 36.

If all videos 20, also called movies, are stored in an uncompressed format, each video has the same file size (in bytes) as all other videos 20. If that is the case, then the best way to store these videos is in the video sequential format. If each tile 48, 50 or 54 is stored as an $C_R$:1 compressed raster, $C_R$ remaining constant for all tiles 48, 50 or 54, each video 10 is also of the same size (in bytes) as all other videos 20. In this case, the best way to store these videos 20 is also in a video sequential format. In all other cases, it is more desirable to store videos 20 in a video interleaved format.

To access a single tile 48, 50 or 54 from any video 20, the offset to the start of each tile 48, 50 or 54 is obtained using a mathematical formula which is derived depending on how videos 20 are organized and stored in storage drive 36. A single seek and a single read operation can access any tile 48, 50 or 54 for any frame for any RRD 58 of the entire large format frame 22. For optimized storage drive 36 access, each tile is stored at a disk block boundary, as shown in FIG. 11.

FIG. 11 illustrates a file 78 having a fixed header 80 and a variable header 82. Between headers 80 and 82 are a plurality of videos 20. Videos 20, identified as $M_1$ through $M_i$, are made from a temporal sequence of tiles 48, 50 and 54 of very large frame 22. Videos 20, identified as $M_{1,1}$ through $M_{i,1}$, are made from a temporal sequence of tiles 48, 50 and 54 of RRD 1. Video 20, identified as $M_{1,N}$, is made from a temporal sequence of tiles 48 of RRD N.

An expanded view of a set of data 84 of video 20, identified as $M_1$, is shown below file 78. File 84 includes a plurality of Disk Block Alignment Bytes (DBAB) 86 that precede each block of video segment bytes 88. Each block of tile bytes preferably is stored in an uncompressed format or having an N:1 compressed raster. For each DBAB 86, $0 \leqq DBAB < $Storage Device Block Size. Each block of video segment bytes 88 are always disclose block aligned to optimize performance of system 30. Storage drive 36 is formatted to include a block size that is an integer multiple of a size of video segment size.

Figure 12:
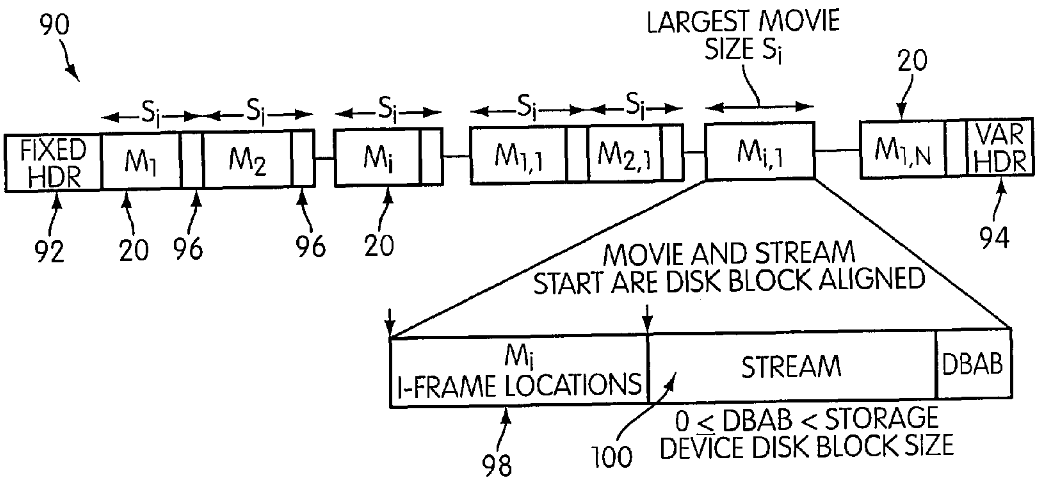
FIG. 12 illustrates how a plurality of videos having varying file size may be stored within fixed length records to optimize retrieval according to one embodiment of the present invention.

FIG. 12 illustrates how a plurality of videos 20 having varying file size may be stored within fixed length files 90 to optimize retrieval according to one embodiment of the present invention. Videos 20 may be encoded with motion compensation. In video compression, motion compensation is a technique for describing a picture in terms of the transformation of a reference picture to the current picture. The reference picture may be previous in time or even from the future. When images can be accurately synthesised from previously transmitted/stored images then the compression efficiency can be improved. When videos 20 are stored in an MPEG format, images are predicted from previous frames (P frames) or bidirectionally from previous and future frames (B frames). After predicting frames using motion compensation, a coder finds the error (residual) which is then compressed and transmitted.

If videos 20 are encoded with motion compensation, each video 20 could be of a different size than the other. For ensuring quality, all videos 20 are encoded using the same codes. To store such videos 20 such that start location of each video 20 can be derived arithmetically, please refer to the storage technique described in FIG. 11. To store movies where minimizing disk space utilization is requirement, please refer to the storage technique described in FIG. 12.

If videos 20 are compressed with motion compensation using MPEG compatible standard, each video 20 will be of a different size. When one or more videos 20 are of a different size, take the largest video 20 and align its file size to the nearest disk-block-aligned size. Disk space is then reserved for all videos 20 that have this size. If encoding uses I-frames as in MPEG standards, each video 20 stores a header 92 with locations of each I-frame as an offset relative to start of video 20. The start position of any video file is then provided by a formula. Thusly, no search of storage drive 36 for a particular position is involved. If tile-movies are compressed with motion compensation using MPEG compatible standard, each video 20 will be of a different size. If storage drive 36 space is of concern, the variable file header 94 at the end of the file will contain links to the start of each movie. The start of each video 20 is disk block aligned with Disk Block Alignment Bytes (DBAB) 96 and the video 20 is stored within a contiguous disk block aligned section 98 followed by the video stream 100, where 0≦DBAB<Storage Device Block Size.

Figure 13:
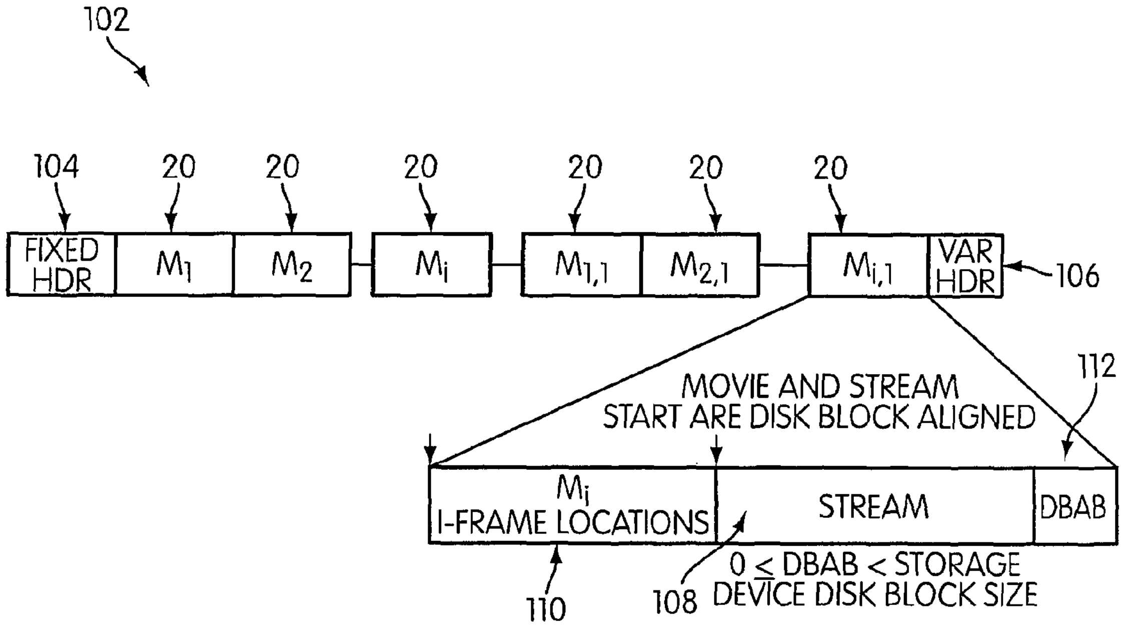
FIG. 13 illustrates how a plurality of videos having varying file size may be stored within records also having varying length to minimize storage space and optimize retrieval according to one embodiment of the present invention.

FIG. 13 illustrates how a plurality of 20 videos having varying file size may be stored within variable length files 102 to optimize retrieval according to one embodiment of the present invention. A variable length file 102 containing a plurality of videos 20 is illustrated. Variable length file 102 has a fixed header 104 and a variable header 106. A plurality of videos 20 is stored between headers 104 and 106. Videos 20, identified as $M_1$ through $M_i$, are made from a temporal sequence of tiles 48, 50 and 54 of very large frame 22. Videos 20, identified as $M_{1,1}$ through $M_{i,1}$, are made from a temporal sequence of tiles 48, 50 and 54 of RRD 1. An exploded view of the data section for video 20, identified as $M_{i,1}$, is shown below variable length file 102. Video 20 and steam 108 are disk block aligned with I-frame location data 110 and DBAB 112.

Figure 14:
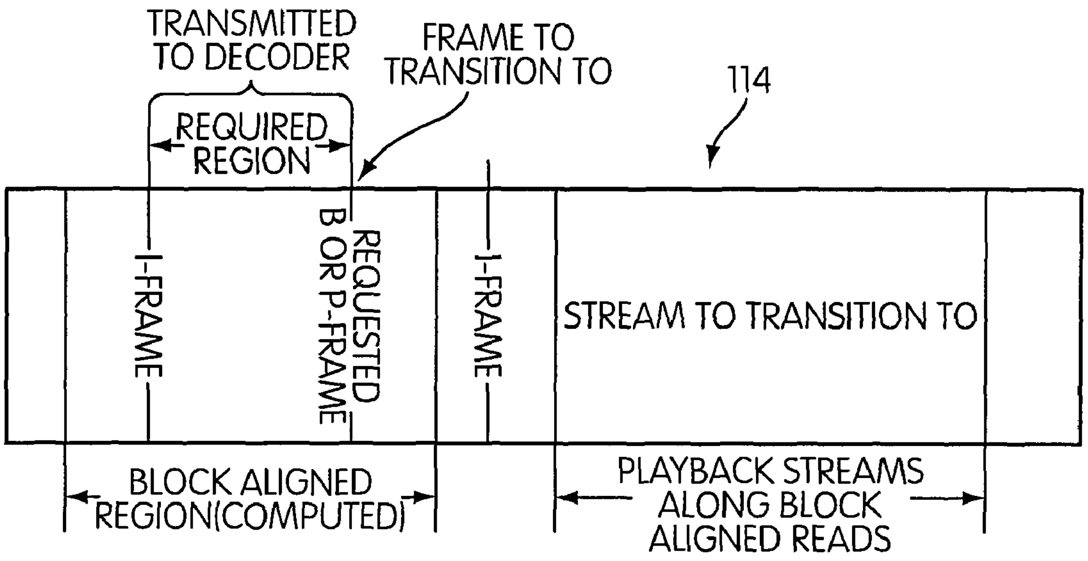
FIG. 14 illustrates an exemplary disk read to enable video stream transition into a new video stream that requires a prior I-frame to decode according to one embodiment of the present invention.

FIG. 14 illustrates an exemplary disk read 114 to enable video stream transition into a new video stream that requires a prior I-frame to decode according to one embodiment of the present invention. When panning in a large video image during playback, the client application may need to transition between videos 20 at a specific time code. If the stream is H.264 encoded with appropriate rules, this transition is facilitated with bit-stream switching. Switching of the streams will enable the streaming tool to jump to the correct time-code and begin playback. For MPEG based streams that have I/P/B frames and require an I-frame to transition at a P/B frame, switching is shown diagrammatically by disk read diagram 114 in FIG. 14.

Specifying storage priority is ideal for streamed playback. If the file 90 or 102 needs to be extended, this storage setting is not ideal. There are two solutions to the problem: (1) pre-allocation and extension by creation of a new file, or (2) storage with smaller video chunks of fixed size. For pre-allocation and extension by creation of a new file, once a file is created, it is not extended. Instead, a new file is created. It is also desirable to reserve space on an existing file to accommodate an anticipated time period. Eventual bulk incremental updates can merge these files into one file while each one is being served. Further, the switch serving feeds from multiple files to multiple feeds in a single file can be implemented to being transparent to a client.

For storage with smaller video chunks of fixed size, data is organized on a disk with panning priority higher than streaming priority. Each movie is further broken up into C chunks that are each $T_c$ seconds in duration. Each chunk is treated as a separate segment of data which is laid out as specified above. Each chunk is stored back to back with the previous chunk. The size of each chunk is fixed and configured to accommodate the largest block of data post-compression and can be pre-computed algebraically. If an extension is necessary, additional C new chunks of T seconds are appended to the existing file with no-data.

Regarding the order of storage of videos 20, consider one frame of a video 20 to contain a total of Rmax rows and Cmax columns of tiles 48, 50 or 54. The tiles 48 may or may not overlap. If they overlap, they would do so based on a certain number of pixels. The number of pixels of overlap along a column or row equals the optimal display width or height of viewport 46. Each video for a tile at row R and C is identified as M(R,C). M(R,C) contains a Group Of Pictures (GOP) laid out as an atomic element that can be played back by itself by a player containing the codec that M(R,C) as encoded in. For instance, if was encoded using H.264, it would contain a GOP that can be decoded independent of all other GOPs within M(R,C).

GOP is an MPEG term meaning Group Of Pictures. It is a collection of consecutive frames of video. Usually between 0.5 and 1 second of video will be held in 1 GOP. Each picture within the GOP can be 1 of 3 types: I (Intra) which is a complete picture that can be decoded without the need to decode any other pictures first. It is similar to a JPEG still image; P (Predicted) where P frames are predicted from the previous "reference" (I or P) frame. If the encoder can find correlation between the previous reference and the P frame, macroblocks in the P frame will be derived from the reference with a motion vector and DCT difference information. In the case where a good match cannot be found, the P frame will contain some intra coded macroblocks; and B (Bidirectional) that are are predicted from the previous and future reference frames. The encoder can use macroblock information each of these frames to produce the best match for each macroblock in the B frame. If no good matches can be found the macroblock will be intra coded. A GOP always starts with an I picture.

An exemplary storage order is a GOP for a video 20 at a specific row and column is followed by a GOP for a video 10 at the next row or column (depending on if it has row or column major order). All GOPs for a single tile 48, 50 or 54 are stored back-to-back, followed by all GOPs for the next row or column (depending on if it has row or column major order). A set of rules by which the data is organized in the file is stored with the file in the variable sized file header. Storage rules are governed by storage priority. The end result is an algebraic offset to the start of required group of frames for a viewport 46 from a larger frame.

A GOP may also be described as a Video Segment (VS). A VS is a single data entity that is read or written to a storage device. A VS may or may not contain data that is aligned to a storage device block boundary. Extra bytes, ranging in size from 0 to a storage device block size minus one can be used to pad each VS if required. Each VS may be stored such that it is padded with additional extra bytes that equal to the size of the largest compressed VS which is aligned to storage device block size. This type of padding creates a "fixed length record" storage. In this case, the offset to any VS in any part of the video or its RRD is computer using simple arithmetic. Each VS may be stored such that it is padded with additional extra bytes such that the resulting size of each VS equals an integral multiple of the storage block device size. In this example, each VS may have a size that is different from the other video segments, which is known as "variable length record" storage. For this kind of storage, the absolute or relative offset to and the size of each VS is stored in a table that is added to the start or appended to the end of each tile video in the FIXED HDR or VAR HDR shown in FIGS. 11 and 12. In this case, the offset to any VS is any part of the video or its associated RRD is computed using a simple arithmetic lookup. If no motion-compensated compression is applied and the data is kept as is or uncompressed, then a VS is always a "fixed length record."

According to one embodiment of the invention, a method of storing a video 20 on storage drive 36, includes formatting a very large frame 22 of an image and storing a sequence of very large frames 22 in storage drive 36. The storage drive 36 is formatted to include a block size, wherein the size of a video segment is an integer multiple of block size and the video segment size corresponds to a display output. Pixel data is read by computer 34 of a source very large frame 22 and generating, from the read pixel data, a first tile 48, 50 or 54 and a second tile 48, 50 or 54, wherein the first tile 48, 50 or 54 and the second tile 48, 50 or 54 each have overlapping portions $P_c$ and $P_r$ that overlap by an adjustable amount, and the overlapping portions $P_c$ and $P_r$ include substantially identical pixel data. The first and second tiles 48, 50 and 54 are stored in storage drive 36. The reading, generating, and storing of information related to very large frames 22 is repeated a plurality of times to store very large frames 22, wherein the very large frame 22 is stored in storage drive 36 as a contiguous string of data as a file 78, 90, or 102. A sequence of very large frames 22 is stored in storage drive 36, wherein a first video 20 is comprised of a first temporal sequence of first tiles 48, 50 or 54.

An RRD 58 may be formatted for each very large frame 22. In addition, a second video 20 comprised of a second temporal sequence of first tiles 48, 50 or 54 may be stored in storage drive 36, wherein the first and second videos 20 are stored sequentially. Alternatively, a second video 20 comprised of a second temporal sequence of first tiles 48, 50 or 54 may be stored in storage drive 36, wherein the first and second videos 20 are stored in an interleaved format.

A single seek and a single read operation performed by storage drive 36 can access a selected tile 48, 50 or 54 for a selected RRD 58 set for a selected image frame for a selected video 20. In addition, storage drive 36 is formatted to store a plurality of videos 20 as a plurality of fixed length records 90 of equal length for optimized retrieval, wherein at least two of the videos 20 have different sizes. Still further, the first video 20 may be encoded with motion compensation to compress a size of the first video 20.

Additionally, each RRD 58 may be formatted to be formed of overlapping tiles 48, 50 and 54 and/or storing each tile 48, 50 and 54 at a disk block boundary. Also, storage drive 36 may be formatted to store a plurality of variable length videos 20 as a plurality of variable length records 102 for optimized storage.

In another embodiment of the invention, a method for viewing a video stream 100 or 108 from large data files 90 or 102 with high ratio in and out zoom and/or pan without image degradation and with high speed of image presentation and manipulation is supported by system 30. This method includes storing temporally sequential image sections of very large frames 22 in tiled and overlapping format in storage drive 36 and streaming temporally sequential image data to a display 32 without substantial computer operating system intervention from computer 34, wherein display interrupts interrupt synchronously generates a graphics board interrupt are applied to allow accumulation of information and change of a display image occurs during vertical intervals.

This method can also include performing a single seek and a single read operation on storage drive 36 to access a selected tile 48, 50, or 54 for streaming to the display 32. In addition, in this method the temporally sequential image sections of very large frames 22 may be formatted into a video 20. Still further, the method may include storing each tile 49, 50 and 52 at a disk block boundary. This method can also include performing a single seek and single read operation on storage drive 36 to access a Video Segment (VS) that is comprised of two or more tiles 48, 50, or 54.

System 30 allows for viewing a video stream 100 or 108 from large digital data files 90 or 102 with high ratio in and out zoom and/or pan without image degradation and with high speed of image presentation and manipulation. System 30 includes means storage drive 36 for storing temporally sequential image sections of the very large frames 22 in tiled and overlapping format in a storage drive 36, and circuitry for streaming temporally sequential image data to a display without substantial computer operating system intervention, wherein the streaming is performed so that display interrupts are applied to allow accumulation of information and change of a display image occurs during intervals.

In the system 30, the temporally sequential image sections of very large frames 22 may be formatted into a video 20 and each tile 48, 50 or 54 of each image section may be stored at a disk block boundary on the storage drive 36. Further, the video 20 may be encoded with motion compensation to compress a size of the video 20. In addition, the storage drive 36 may be formatted to store a plurality of videos 20 as a plurality of fixed length records 90 of equal length for optimized retrieval, wherein at least two of the videos 20 have different sizes. Also, the storage drive 36 may be formatted to store a plurality of variable length videos 20 as a plurality of variable length records 102 for optimized storage.

System 30 may further include storage device 36 for formatting and storing RRDs 58 for each very large frame 22. Storage device 36 can include a disk drive having blocks, wherein the blocks are formatted so that a size of the video segments is an integer multiple of a block size.

A temporal sequence of very large frames 22 form a very large video 20. Each tile 48 is a part of one very large frame 22. Tiles 48, as described above, are formatted having overlapping rows and columns. The number of overlapped pixels equals the optimal size of display 46. Tiles 48 having identical Cartesian coordinates taken at sequential points of time comprise a video 20. Thus, corresponding to each tile 48 is a video 20. Each video 20 is encoded as a Group of Pictures (GOP) using an existing standard codec. These GOPs are either uncompressed or encoded using a codec, such as, for example, H.264, MPEG, or JPEG 2000. This listing of codecs is merely exemplary and other codecs may be used. A read operation reads a GOP as a single unit of data. Tiles 48 may be stored in order of columns, which is referred to as a column-major storage. Tiles 48 may also be stored in order of rows, which is referred to as row-major storage.

Figure 15:
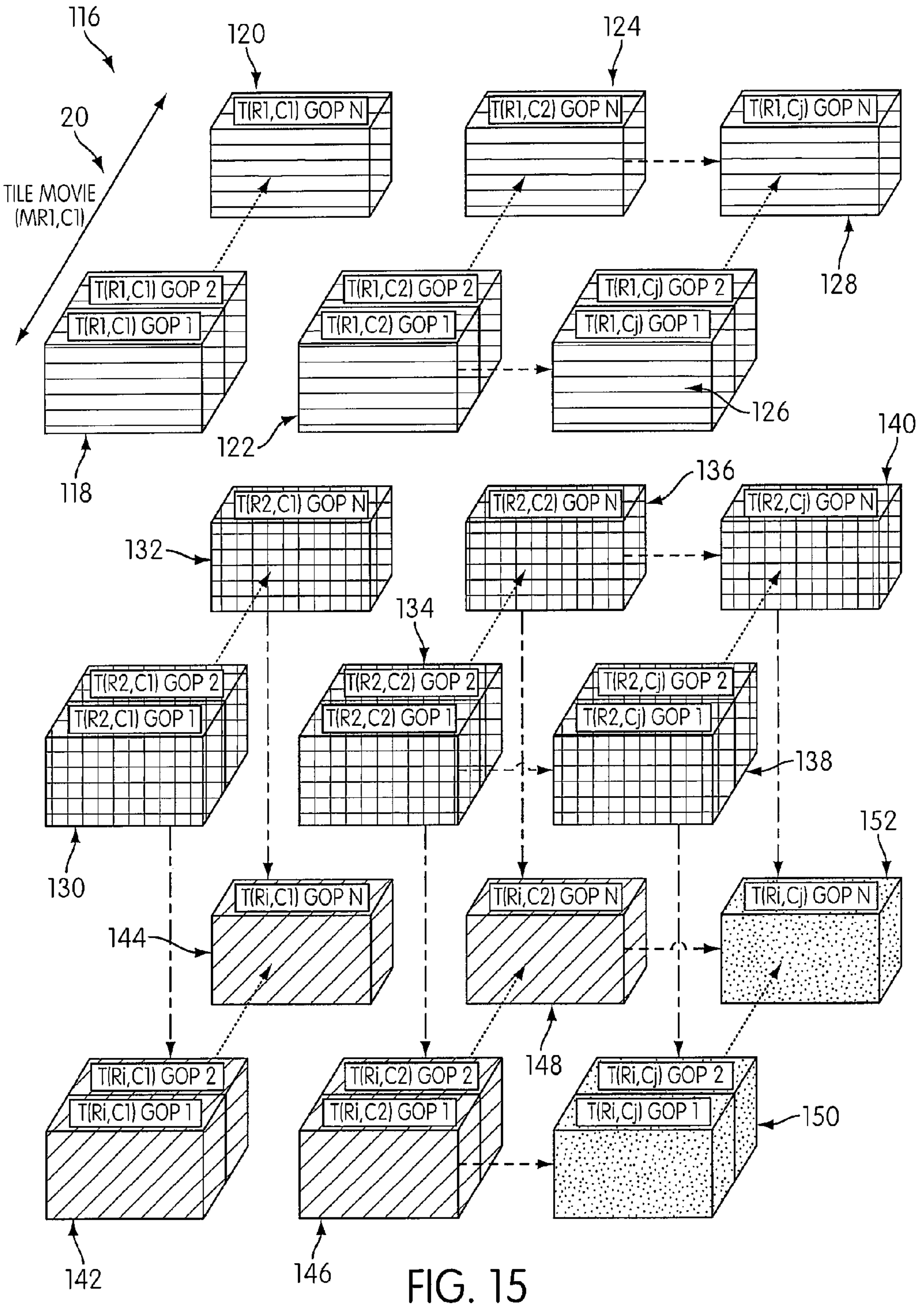
FIG. 15 illustrates a block diagram of a plurality of videos formed of a temporal sequence of tiles.

FIG. 15 illustrates a block diagram 116 of a plurality of very large format videos 20 formed of a temporal sequence of tiles 48. Box 118 represents a first GOP, GOP 1, for tile 48 having Cartesian coordinates $T(R_1,C_1)$, designating row 1 and column 1. Box 120 represents an Nth GOP, GOP N, for tile $T(R_1,C_1)$. Box 122 represents a first GOP, GOP 1, for tile 48 having Cartesian coordinates $T(R_1,C_2)$, designating row 1 and column 2. Box 124 represents an Nth GOP, GOP N, for tile $T(R_1,C_2)$. Box 126 represents a first GOP, GOP 1, for tile 48 having Cartesian coordinates $T(R_1,C_j)$, designating row 1 and column j. Box 128 represents an Nth GOP, GOP N, for tile $T(R_1,C_j)$. Box 130 represents a first GOP, GOP 1, for tile 48 having Cartesian coordinates $T(R_2,C_1)$, designating row 2 and column 1. Box 132 represents an Nth GOP, GOP N, for tile $T(R_2,C_1)$. Box 134 represents a first GOP, GOP 1, for tile 48 having Cartesian coordinates $T(R_2,C_2)$, designating row 2 and column 2. Box 136 represents an Nth GOP, GOP N, for tile $T(R_2,C_2)$. Box 138 represents a first GOP, GOP 1, for tile 48 having Cartesian coordinates $T(R_2,C_j)$, designating row 2 and column j. Box 140 represents an Nth GOP, GOP N, for tile $T(R_2,C_j)$. Box 142 represents a first GOP, GOP 1, for tile 48 having Cartesian coordinates $T(R_3,C_1)$, designating row 3 and column 1. Box 144 represents an Nth GOP, GOP N, for tile $T(R_3,C_1)$. Box 146 represents a first GOP, GOP 1, for tile 48 having Cartesian coordinates $T(R_3,C_2)$, designating row 3 and column 2. Box 148 represents an Nth GOP, GOP N, for tile $T(R_3,C_2)$. Box 150 represents a first GOP, GOP 1, for tile 48 having Cartesian coordinates $T(R_3,C_j)$, designating row 3 and column j. Box 152 represents an Nth GOP, GOP N, for tile $T(R_3,C_j)$. Videos 20 are made of each sequential GOP 118-152 for each tile 48 having identical Cartesian coordinates. Each GOP 118-152 is a set of data C within a tile's 48 video 20 comprising a GOP for one or more frames.

Figure 16:
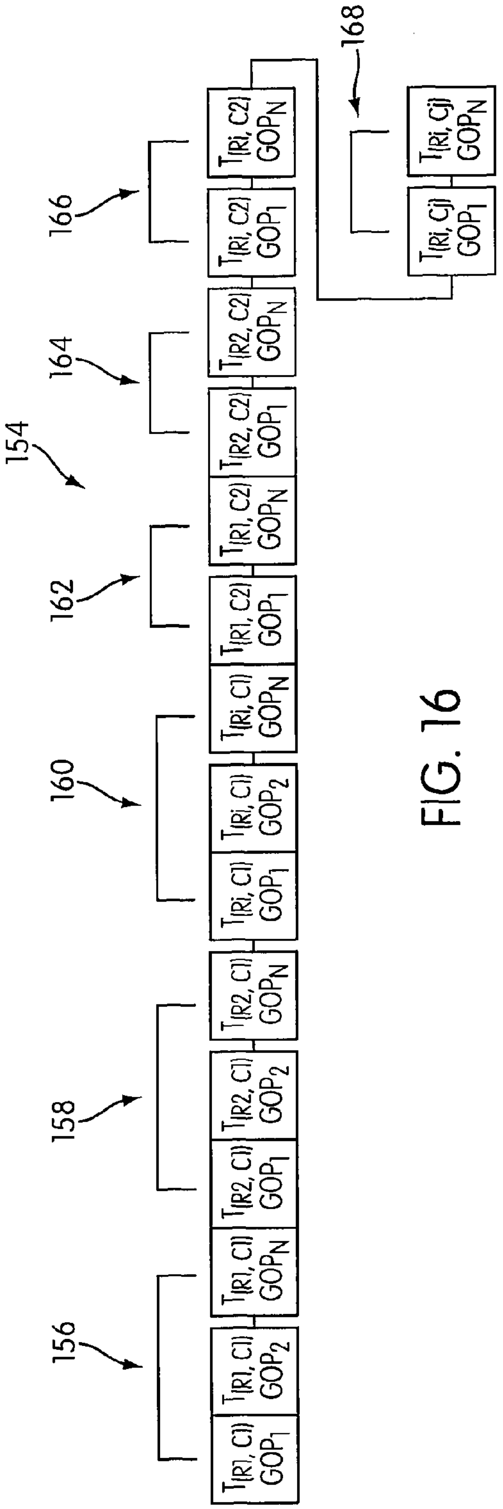
FIG. 16 illustrates a video having a video sequential format.

FIG. 16 illustrates a video 20 having a video sequential format 154. For a video 20 where all of the GOPs constituting the video are stored contiguously, the video 20 is stored in a video sequential format 154. Each GOP, 1 through N, constitutes a video segment. These video segments combine to form video 20. Section 156 of video sequential format 154 contains the $GOP_{1\text{-}N}$ for tile 48 $T(R_1,C_1)$. Section 158 contains the $GOP_{1\text{-}N}$ for tile 48 $T(R_2,C_1)$. Section 160 contains the $GOP_{1\text{-}N}$ for tile 48 $T(R_i,C_1)$. Section 162 contains the $GOP_{1\text{-}N}$ for tile 48 $T(R_1,C_2)$. Section 164 contains the $GOP_{1\text{-}N}$ for tile 48 $T(R_2,C_2)$. Section 166 contains the $GOP_{1\text{-}N}$ for tile 48 $T(R_i,C_2)$. Section 168 contains the $GOP_{1\text{-}N}$ for tile 48 $T(R_i, C_j)$.

Figure 17:
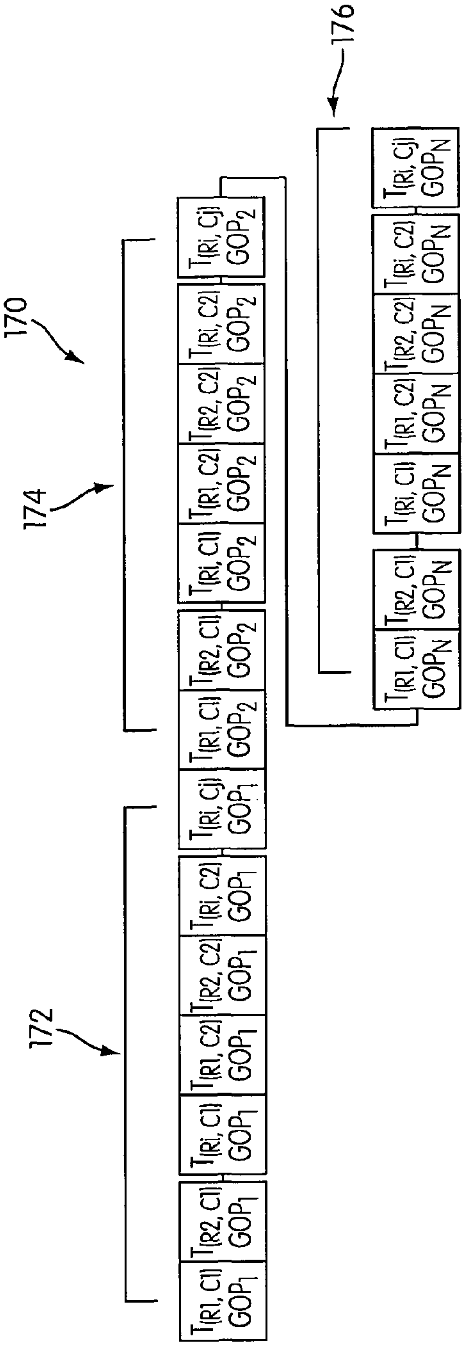
FIG. 17 illustrates a video having a video interleaved format.

FIG. 17 illustrates a video 20 having a video interleaved format 170. A video 20 is stored in a video interleaved format 170 when all GOPs for all tiles 48 within the same group of frames 22 are stored contiguously. Section 172 shows that all GOPs 1 for every tile 48 $T(R_1,C_1)$ to $T(R_i,C_j)$ are stored contiguously. Section 174 shows that all GOPs 2 for every tile 48 $T(R_1,C_1)$ to $T(R_i,C_j)$ are stored contiguously. Section 176 shows that all GOPs N for every tile 48 $T(R_1,C_1)$ to $T(R_i,C_j)$ are stored contiguously. Each GOP, 1 through N, constitutes a video segment. These video segments combine to form video 20.

Figure 18A:
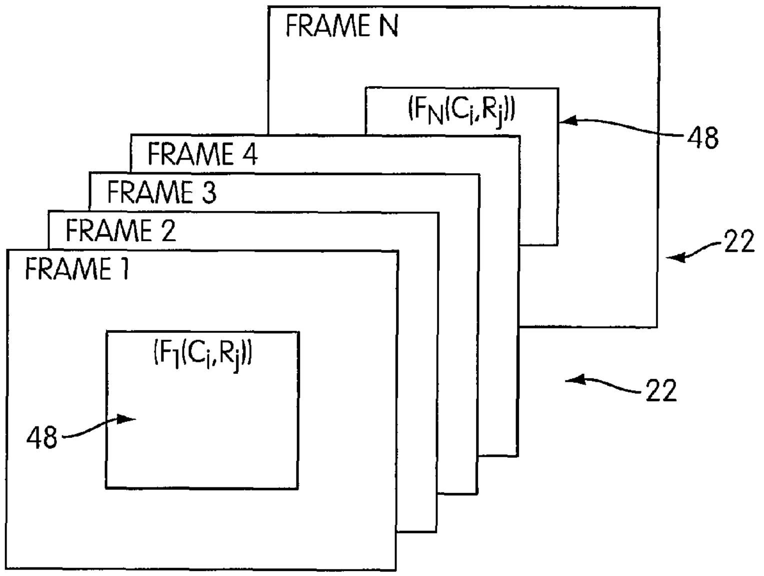
FIGS. 18A-C illustrate a video segment.
Figure 18B:
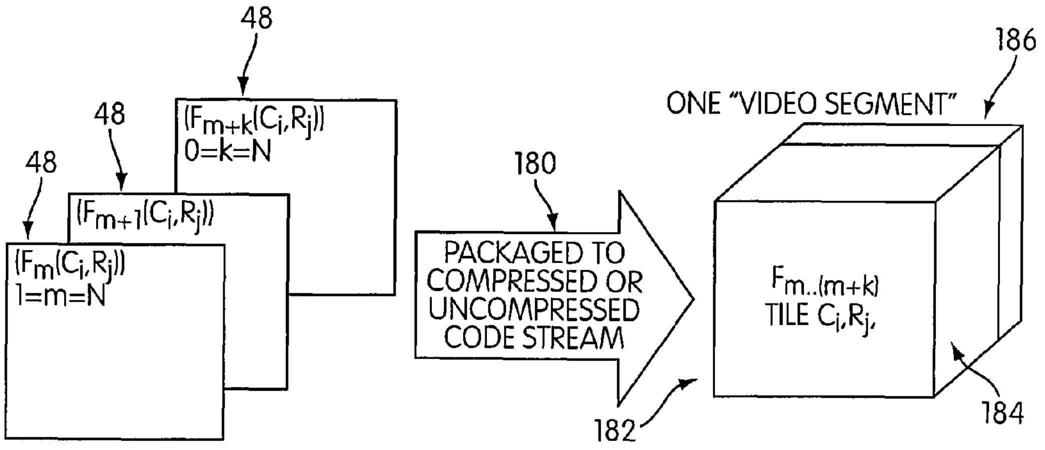
Figure 18C:
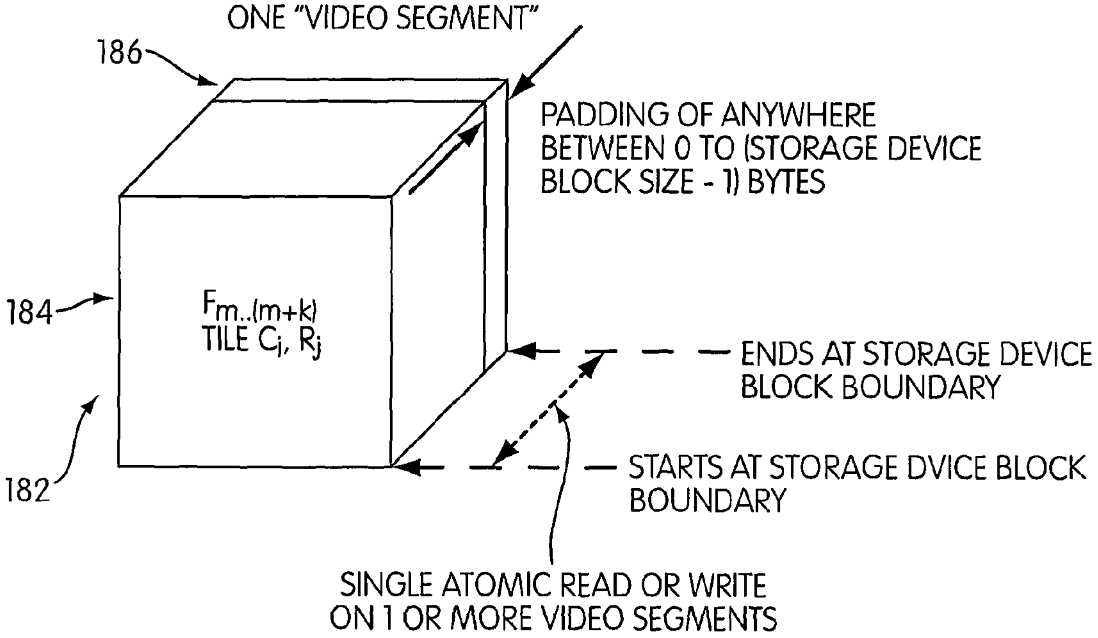

FIGS. 18A-C illustrate a video segment. FIG. 18A illustrates a plurality of temporally contiguous frames 22. Within each frame 22 is a tile 48, wherein each tile 48 has identical Cartesian coordinates for each frame 22. This temporally contiguous group of tiles 48 is a single sequence that may either be formed of compressed or uncompressed data in process 180 to form a video segment 182. A video segment 182 is formed of one or more temporally consecutive frames 22 worth of that specific tile 48 for each frame 22, where that group of tiles 48 is packaged as a single entity that is compressed or uncompressed and is read or written as a whole, with reading and writing performed at storage device block boundaries for optimal performance. The sequence of tiles forming video segment 182 is shown as data block 184. When video segment 182 is not aligned to a storage device block size, it may be padded by a specified number of bytes by a data pad 186.

Video segment 182 is shown having a data block 184 comprising a sequence of frames 48 and a data pad 186 having a size of 0 bytes to (storage device block size-1) bytes. If the data is compressed, it may use a published or proprietary frame-based or streamed compression codec. The resulting set of bytes in the code stream may or may not be aligned to the block size of a storage device on which it is stored. These bytes are always stored starting from a location in a disk file that is an integral multiple of the block size of the storage device on which the file is stored. The number of bytes written or read from the storage device will always be the nearest integral multiple of the storage device block size greater than or equal to the bytes in the code stream. A single read or write operation will thus read or write one or more such video segments as a single code stream that begins at a storage device block boundary and is wholly contained within an integral multiple of the storage device block size. In some published compression codecs, this is also referred to as a GOP or a Group of Pictures. Since this is a completely distinct entity as it is a part of an even larger image, it is referred to as a "video segment" 182. A "video segment" comprises of a code stream 182 of one or more compressed or uncompressed tiles 48 that are temporally contiguous and for each of its parent frame 22, represent same tile 48 spatially, that is read or written as the smallest possible read or write operation; and it starts and ends at a storage device block boundary. A single read or write operation reads or writes no less than one video segment and may read or write more than one video segment.

Figure 19:
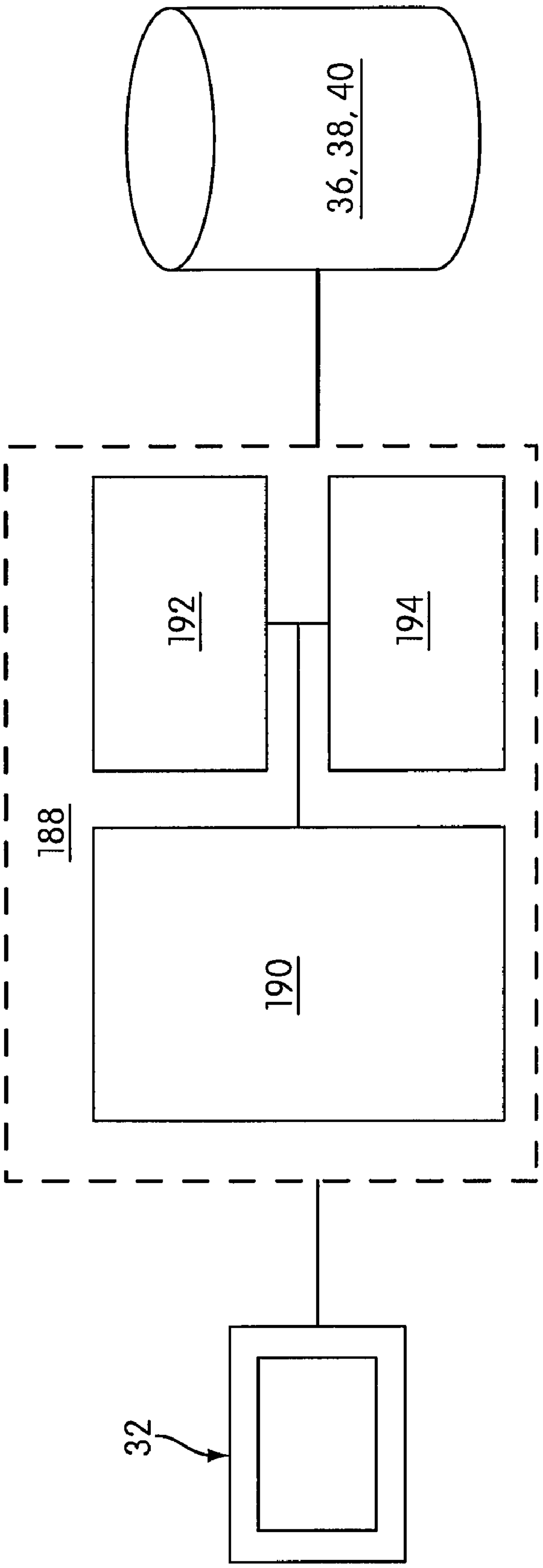
FIG. 19 illustrates a block diagram of a software system according to one embodiment of the present invention.

FIG. 19 illustrates a block diagram of a software system 188 according to one embodiment of the present invention. Software system 188 includes an image frame formatting module 190 configured to format an image frame. The image frame formatting module 190 is also configured to read pixel data of a source image and generate, from the read pixel data, a first tile and a second tile, wherein the first tile and the second tile each have overlapping portions that overlap by an adjustable amount. The overlapping portions may include substantially identical pixel data. Image frame formatting module 190 is also configured to store the first tile and the second tile on storage device 36, 38, or 40 (as shown in FIG. 2). Still further, the image frame formatting module 190 is configured to repeat the reading, generating, and storing of a plurality of tiles to store the image frame. The image frame formatting module 190 is also configured to store the image frame on the storage device as a contiguous stream of data. The image frame formatting module being 190 is also configured to store a sequence of image frames on storage device 36, 38 or 40, wherein a first video segment is comprised of a first temporal sequence of first tiles.

Software system 188 also includes a reduced resolution dataset module 192 configured to format a reduced resolution data set for each image frame. System 188 also include an image frame display module 194 that is configured to stream temporally sequential image data to display 32 without substantial computer operating system intervention, wherein when panning or zooming results in switching to a different video segment, switching between video segments occurs within a display refresh interval of display 32. Software system 188 operates on computer 34. Software modules 190, 192, and 194 are interlinked, communicate, and share data with each other.

While the invention has been shown and described with reference to a particular embodiment thereof, it will be understood to those skilled in the art, that various changes in form and details may be made therein without departing from the spirit and scope of the invention.

We claim:

1. A method, implemented by a computer system, for storing a video on a storage device, the method comprising:

formatting, using the computer system, a first image into a first tile and a second tile;

formatting, using the computer system, a second image into a first tile and a second tile, the first image and the second image being captured as a temporal sequence at successive points in time;

generating a first video segment by selecting the first tile of the first image and the first tile of the second image, in sequence;

generating a second video segment by selecting the second tile of the first image and the second tile of the second image, in sequence; and storing, by the computer system, the first video segment and the second video segment in a file on the storage device.

2. The method of claim 1, wherein the first tile and the second tile of the first image have overlapping portions and the first tile and the second tile of the second image have overlapping portions, the overlapping portions overlap by an adjustable amount and include substantially identical pixel data.

3. The method of claim 2, wherein a size of the overlapping portions of the first tile and the second tile of first image is substantially equal to a size of a display area of a display device, and a size of the overlapping portions of the first tile and the second tile of the second image is substantially equal to the size of the display area of the display device.

4. The method of claim 1, further comprising formatting a reduced resolution dataset for the first image and the second image.

5. The method of claim 4, wherein the formatting a reduced resolution dataset for the first image and the second image comprises formatting a reduced resolution dataset for the first image and the second image such that each reduced resolution dataset comprises one or more tiles.

6. The method of claim 5, wherein the reduced resolution dataset of the first image has successively lower image resolution and fewer pixels than a previous reduced resolution dataset and each reduced resolution dataset captures substantially an entire image area, and wherein the reduced resolution dataset of the second image has successively lower image resolution and fewer pixels than a previous reduced resolution dataset and each reduced resolution dataset captures substantially an entire image area.

7. The method of claim 5, further comprising formatting the reduced resolution dataset of the first image to include overlapping tiles and formatting the reduced resolution dataset of the second image to include overlapping tiles.

8. The method of claim 1, wherein the storing comprises storing sequentially the first video segment and the second video segment.

9. The method of claim 1, wherein the storing comprises storing in an interleaved format the first video segment and the second video segment.

10. The method of claim 1, further comprising accessing the first video segment or the second video segment through a single seek and a single read operation of the storage device.

11. The method of claim 1, wherein the storing comprises storing the first tile and the second tile of the first image and storing the first tile and the second tile of the second image at a disk block boundary of the storage device so as to optimize access to the storage device.

12. The method of claim 1, wherein the storing comprises storing the first video segment and the second video segment as equal length records on the storage device.

13. The method of claim 12, wherein the storing comprises padding the first video segment or padding the second video segment, or both with additional data so as to obtain equal length records.

14. The method of claim 1, further comprising formatting the storage device to store the first video segment and the second video segment on the storage device as a plurality of equal length records for optimized retrieval from the storage device.

15. The method of claim 1, wherein the storing comprises storing the first video segment and the second video segment as a plurality of variable length records on the storage device.

16. The method of claim 1, further comprising formatting the storage device to store the first video segment and the second video segment as a plurality of variable length records for optimized retrieval.

17. The method of claim 1, further comprising formatting the storage device to include a block size, wherein a size of the first video segment and a size of the second video segment is an integer multiple of the block size.

18. The method of claim 1, further comprising encoding the first video segment or encoding the second video segment, or both with motion compensation to compress a size of the first video segment or to compress a size of the second video segment, or both.

* * * * *